United States Patent
Honda et al.

(10) Patent No.: US 9,531,203 B2
(45) Date of Patent: Dec. 27, 2016

(54) SECONDARY BATTERY SYSTEM

(71) Applicant: Panasonic Corporation, Osaka (JP)

(72) Inventors: Kazuyoshi Honda, Osaka (JP);
Yoshikazu Yamaoka, Gifu (JP);
Kensuke Nakura, Osaka (JP)

(73) Assignee: PANASONIC CORPORATION, Osaka (JP)

( * ) Notice: Subject to any disclaimer, the term of this patent is extended or adjusted under 35 U.S.C. 154(b) by 130 days.

(21) Appl. No.: 14/670,567

(22) Filed: Mar. 27, 2015

(65) Prior Publication Data
US 2015/0295431 A1    Oct. 15, 2015

(30) Foreign Application Priority Data

Apr. 11, 2014 (JP) .................................. 2014-082231
Apr. 11, 2014 (JP) .................................. 2014-082232

(51) Int. Cl.
| | | |
|---|---|---|
| *H01M 10/46* | (2006.01) | |
| *H02J 7/00* | (2006.01) | |
| *H01M 10/44* | (2006.01) | |
| *H02J 7/04* | (2006.01) | |
| *H02J 7/34* | (2006.01) | |

(52) U.S. Cl.
CPC .......... *H02J 7/0021* (2013.01); *H01M 10/443* (2013.01); *H02J 7/007* (2013.01); *H02J 7/0013* (2013.01); *H02J 7/0063* (2013.01); *H02J 7/0086* (2013.01); *H02J 7/0091* (2013.01); *H02J 7/045* (2013.01); *H02J 7/047* (2013.01); *H02J 7/345* (2013.01); *H02J 2007/0067* (2013.01)

(58) Field of Classification Search
CPC ........ H02J 7/0013; H02J 7/007; H02J 7/0093; H02J 7/0077; H02J 7/0091
USPC ................ 320/107, 116, 119, 125, 132, 149, 320/150, 320/160
See application file for complete search history.

(56) References Cited

U.S. PATENT DOCUMENTS

| | | | | |
|---|---|---|---|---|
| 5,801,514 | A * | 9/1998 | Saeki ................. | H01M 10/425 320/136 |
| 2005/0266299 | A1 | 12/2005 | Nishiyama et al. | |
| 2011/0229746 | A1* | 9/2011 | Kessler ............... | H01M 10/482 429/90 |
| 2013/0234508 | A1 | 9/2013 | Eisele et al. | |

FOREIGN PATENT DOCUMENTS

| | | |
|---|---|---|
| JP | 4-123771 | 4/1992 |
| JP | 6-290814 | 10/1994 |

(Continued)

*Primary Examiner* — Edward Tso
(74) *Attorney, Agent, or Firm* — McDermott Will & Emery LLP

(57) ABSTRACT

A secondary battery system according to one aspect of the present disclosure includes: a plurality of secondary batteries; a power source; and a control circuitry. The control circuitry is operative to intermittently charges each of the plurality of secondary batteries plural times with a pause between charges while repeating a cycle including (a) selecting a secondary battery to be charged next from among the plurality of secondary batteries and (b) charging the selected secondary battery at a charging current not less than a standard current. The standard current is defined to reduce a charging capacity of each secondary battery decreases by 20% from a maximum charging capacity in a case where the secondary battery is continuously charged at the standard current.

20 Claims, 17 Drawing Sheets

(56) References Cited

FOREIGN PATENT DOCUMENTS

| | | |
|---|---|---|
| JP | 8-237877 | 9/1996 |
| JP | 11-185161 | 7/1999 |
| JP | 11-252812 | 9/1999 |
| JP | 2001-169468 | 6/2001 |
| JP | 2002-171680 | 6/2002 |
| JP | 2004-171864 | 6/2004 |
| JP | 2005-176430 | 6/2005 |
| JP | 2014-506105 | 3/2014 |

* cited by examiner

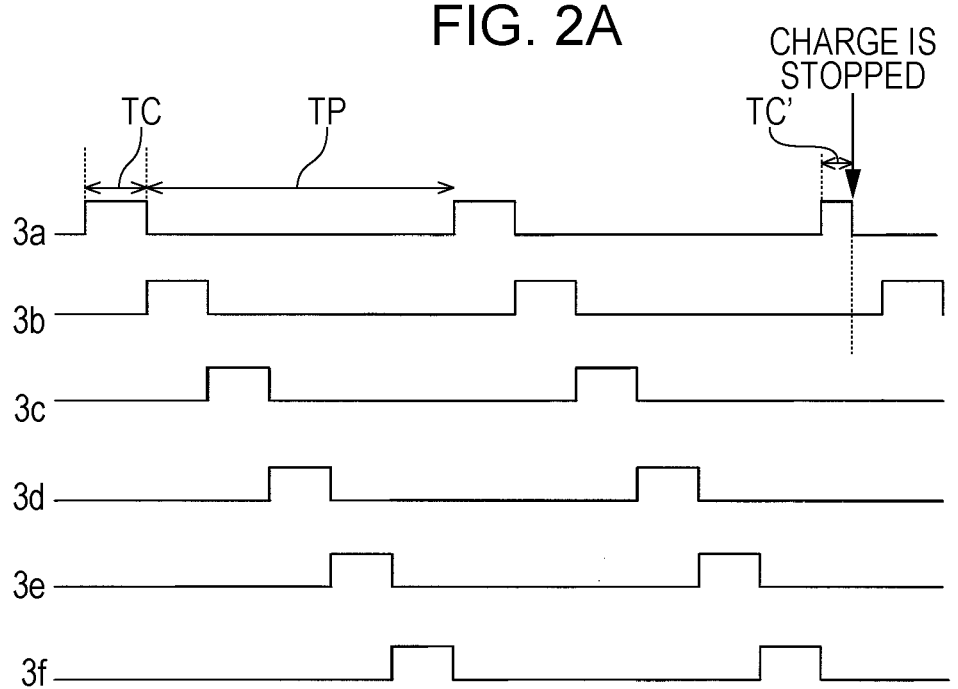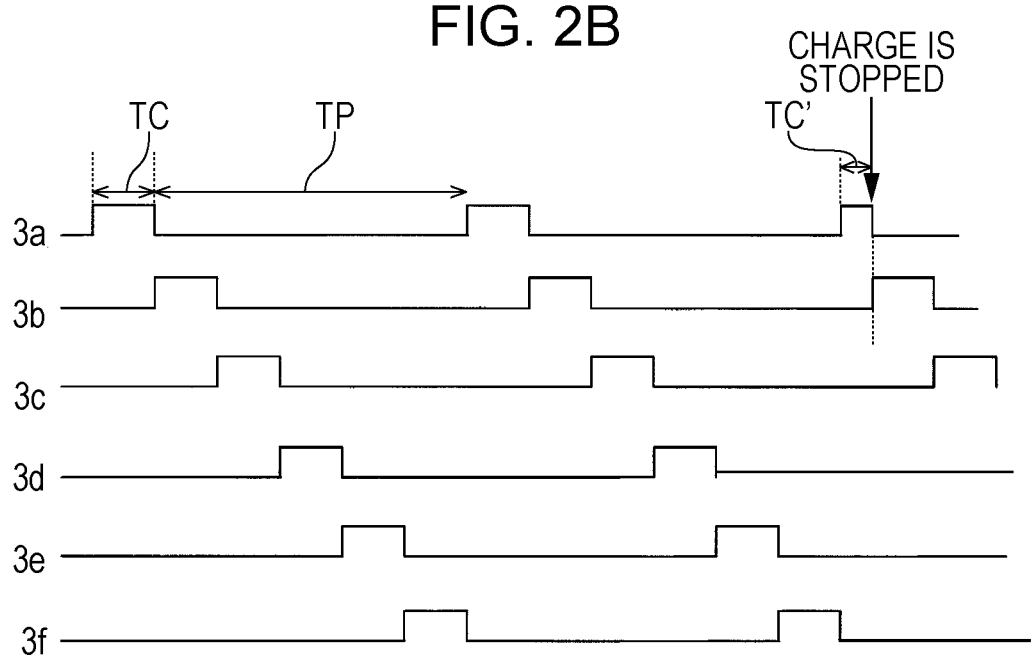

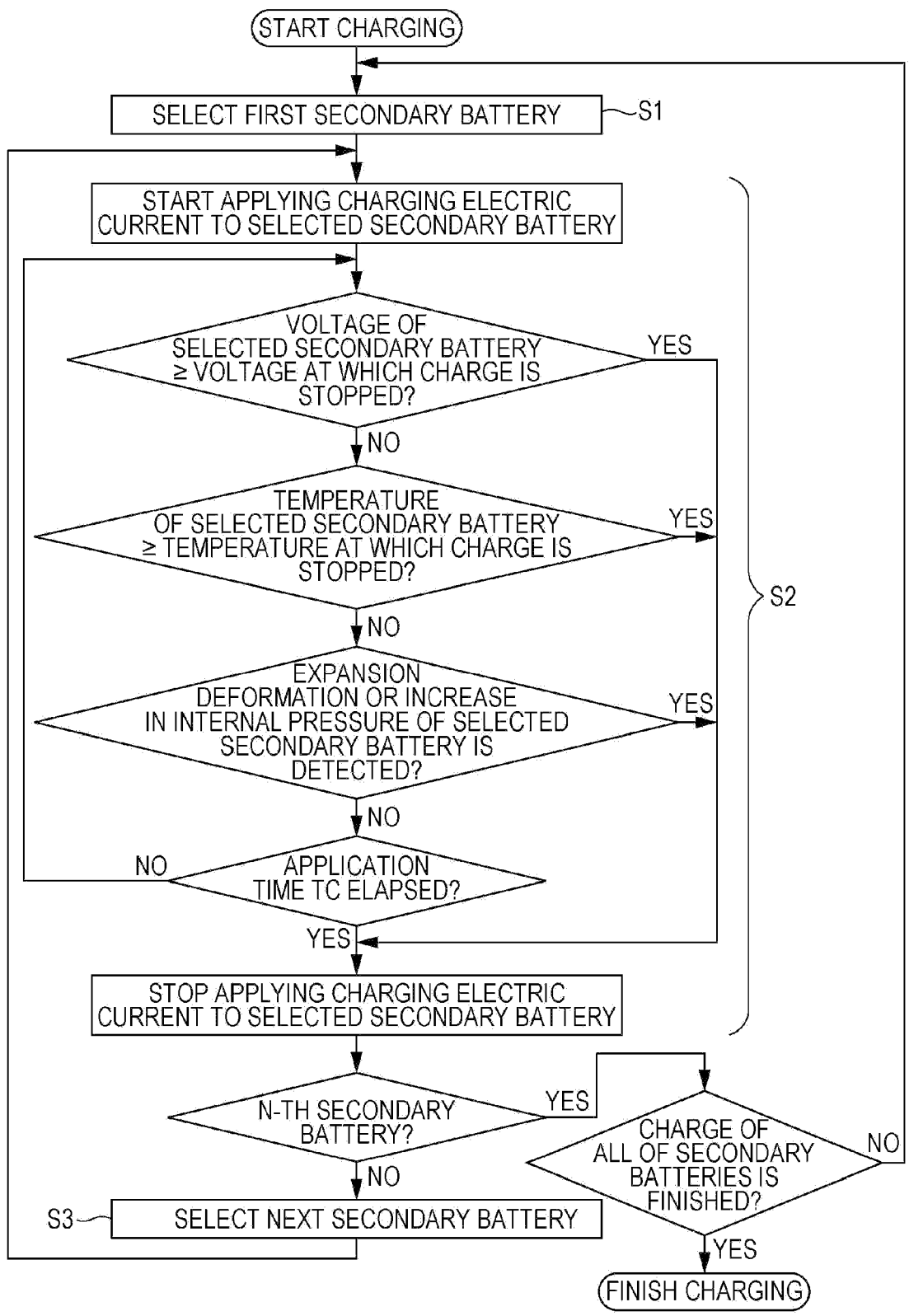

SECONDARY BATTERY SYSTEM

BACKGROUND

1. Technical Field

The present disclosure relates to a secondary battery system.

2. Description of the Related Art

Japanese Unexamined Patent Application Publication No. 8-237877 discloses a method for charging a plurality of secondary batteries with a pulsed current.

Japanese Unexamined Patent Application Publication No. 11-185161 discloses a method for pulse-charging a plurality of batteries while switching a battery charged by a power source in a time-division manner.

Japanese Unexamined Patent Application Publication No. 2005-176430 discloses a power source control system in which a plurality of secondary batteries are used as power sources.

SUMMARY

One non-limiting and exemplary embodiment provides a secondary battery system capable of charging or discharging a plurality of secondary batteries to a high capacity in a short time.

A secondary battery system according to one aspect of the present disclosure includes: a plurality of secondary batteries; a power source operative to supply a current to the plurality of secondary batteries; and control circuitry operative to intermittently charge each of the plurality of secondary batteries plural times with a pause between charges while repeating a cycle including (a) selecting a secondary battery to be charged next from among the plurality of secondary batteries and (b) charging the selected secondary battery at a charging current not less than a standard current, where the standard current is defined to reduce a charging capacity of each secondary battery decreases by 20% from a maximum charging capacity in a case where the secondary battery is continuously charged at the standard current.

It should be noted that comprehensive or specific embodiments may be implemented as control circuitry, a charger, a discharger, a charging method, a discharging method, a charging system, an electricity storage system, or any selective combination thereof.

According to the secondary battery system according to one aspect of the present disclosure, it is possible to charge or discharge a plurality of secondary batteries to a high capacity in a short time.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIGS. 2A and 2B each illustrate a timing diagram of charge in the secondary battery system;

FIG. 3 is a flow chart for explaining an example of a charging method of Embodiment 1;

DETAILED DESCRIPTION

Underlying Knowledge Forming Basis of the Present Disclosure

The underlying knowledge forming the basis of the present disclosure is as follows.

Figure 22:
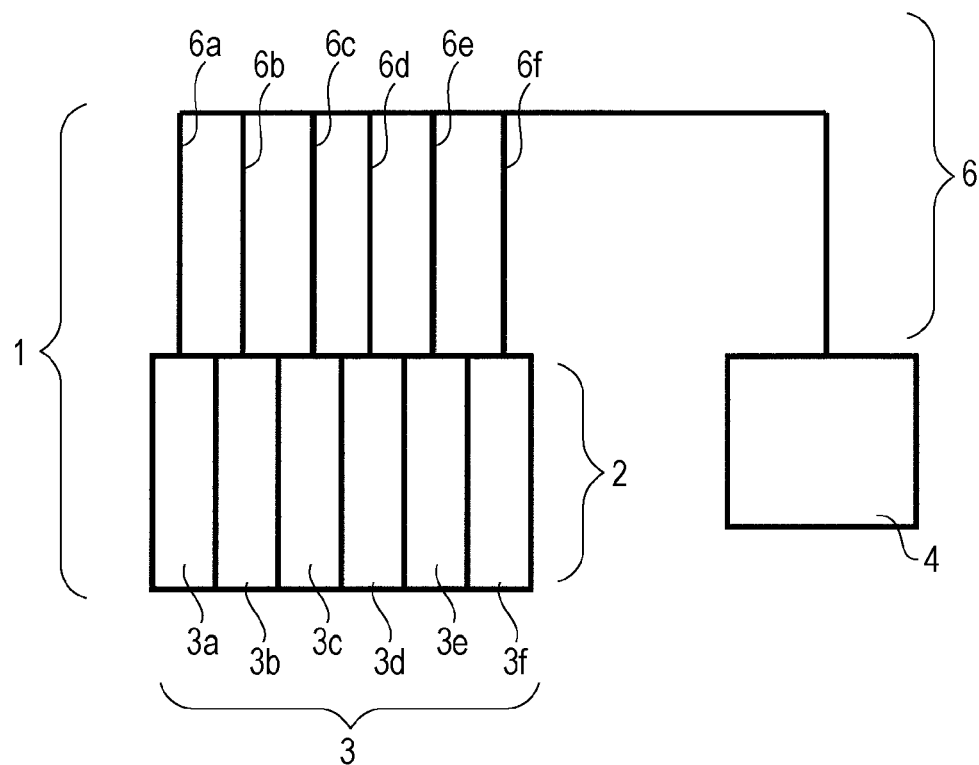
FIG. 22 is a schematic view illustrating a configuration of a battery system of Reference Example 1.

FIG. 22 illustrates a charging and discharging method of Reference Example 1. In Reference Example 1, a plurality of secondary batteries 3a to 3f connected in parallel with each other are concurrently charged by a power source 4. Alternatively, in Reference Example 1, the plurality of secondary batteries 3a to 3f connected in parallel with each other are concurrently discharged, and an obtained current is supplied to a load 8.

Figure 23:
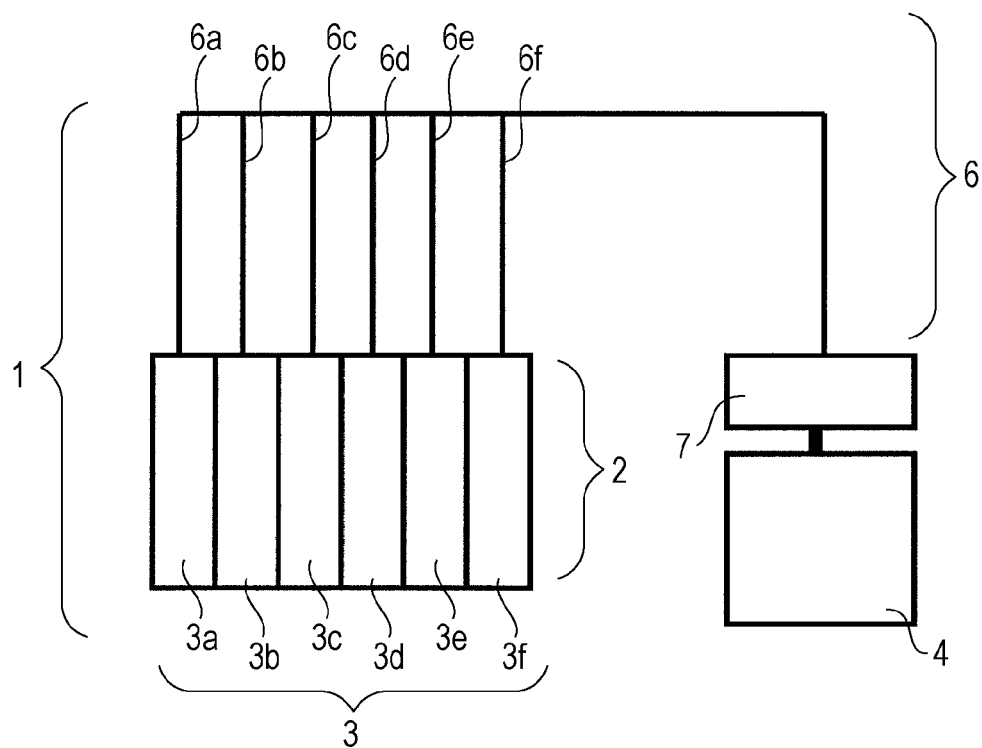
FIG. 23 is a schematic view illustrating a configuration of a battery system of Reference Example 2.

FIG. 23 illustrates a charging and discharging method of Reference Example 2, in which a single controller 7 is provided between a plurality of secondary batteries 3a to 3f and a power source 4. The controller 7 monitors the voltage of each of the secondary batteries 3a to 3f. When the voltage deviates from a predetermined range, the controller 7 stops charging or discharging. This can suppress degradation of the batteries. However, there may be variations in properties among the plurality of secondary batteries 3. For example, in a case where one or some of the secondary batteries 3 is/are replaced, the variations in properties among the secondary batteries 3 become evident. In such a case, there is a possibility that all of the secondary batteries 3 will not be properly charged and discharged.

Figure 24:
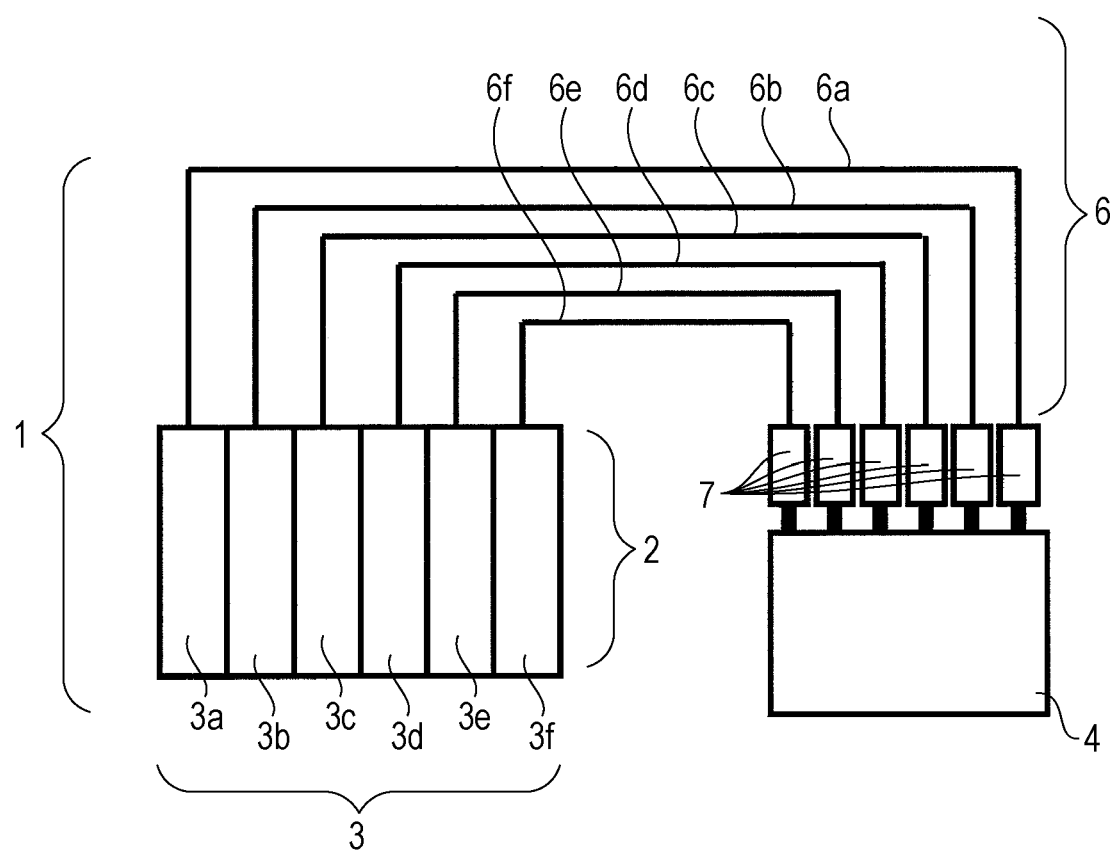
FIG. 24 is a schematic view illustrating a configuration of a battery system of Reference Example 3.

FIG. 24 illustrates a charging method of Reference Example 3, in which a plurality of controllers 7 are respectively provided between a plurality of secondary batteries 3a to 3f and a power source 4. These controllers 7 monitor the voltages of the plurality of secondary batteries 3a to 3f, respectively. According to this method, for example, even in a case where there are variations in properties among the plurality of secondary batteries 3, all of the secondary batteries 3 can be charged and discharged with more certainty. However, this increases the device cost.

Another method is a charging and discharging method of Reference Example 4 in which a plurality of secondary batteries are sequentially charged, unlike in the methods of Reference Examples 1 to 3. In this case, some secondary batteries connected to a power source are sequentially switched. According to this method, all of the secondary batteries can be charged and discharged with more certainty while lowering the device cost.

Conventionally, a current for charging and discharging is kept low in order to charge and discharge a secondary battery. This is considered to be because of the following reason. The rate of diffusion of ions in an electrolytic solution and an active material is limited. Therefore, if charging and discharging are performed at a high current, a steep concentration gradient of ions, such as lithium ions, occurs on an active material surface, for example. This can inhibit further usage of the ions and/or markedly increase the resistance against diffusion of the ions. In a conventional art, in order to reduce such an influence, in a case where charging and discharging are performed at a continuous current, the continuous current is kept low. However, in the method of Reference Example 4, in a case where the plurality of secondary batteries are sequentially charged and discharged at a low charging current, charging or discharging may take a very long time.

As described above, it is difficult to charge and discharge a plurality of secondary batteries in a shorter time by using a simple device.

The inventors of the present invention found the following.

(a) Sufficient charging capacity can be obtained by repeatedly applying a charging current to the secondary battery with a pause between charges, even in a case where the charging current is a high current that decreases, if it is a continuous constant current, charging capacity.

(b) Sufficient discharging capacity can be obtained by repeatedly drawing a discharging current from the secondary battery with a pause between discharges, even in a case where the discharging current is a high current that decreases, if it is a continuous constant current, discharging capacity.

According to the study of the inventors of the present invention, a full charging capacity obtained in the case of intermittently charging the secondary battery at a high charging current is almost equal to that of continuously charging it at a low constant current. Moreover, a discharging capacity obtained in the case of intermittently discharging the secondary battery at a high discharging current is almost equal to that of continuously discharging it at a low constant current. The results of the investigation will be described later.

Various aspects of the present disclosure are based on the above findings. Note that the aspects of the present disclosure are not limited by (a) and (b) described above. One aspect of the present disclosure may relate to a charging method only, a discharging method only, or both a charging method and a discharging method.

Overview of Embodiments

A secondary battery system according to the first aspect of the present disclosure includes: a plurality of secondary batteries; a power source that supplies a current to the plurality of secondary batteries; and a controller that controls an operation for charging the plurality of secondary batteries. The controller intermittently charges each of the plurality of secondary batteries plural times with a pause between charges while repeating a cycle including a step of selecting a secondary battery to next be charged from among the plurality of secondary batteries and a step of charging the secondary battery to be charged at a charging current. The secondary battery to be charged has a property such that a charging capacity decreases by 20% from a maximum charging capacity in a case where the secondary battery to be charged is continuously charged at a standard current. A value of the charging current is not less than that of the standard current.

According to this secondary battery system, a secondary battery to be charged is charged while being switched among a plurality of secondary batteries. With this configuration, the secondary battery system may not have to include a plurality of power sources and a plurality of controllers each corresponding to the plurality of the secondary batteries. It is therefore possible to simplify the configuration of the system.

In a case where the charging current satisfies the above condition, the plurality of secondary batteries can be charged to a high capacity in a short time.

The secondary battery system according to the first aspect of the present disclosure may be arranged such that the controller does not concurrently charge two or more of the plurality of secondary batteries.

This makes it possible to prevent a short circuit among the plurality of secondary batteries, thereby preventing degradation of the secondary batteries.

The secondary battery system according to the first aspect of the present disclosure may be, for example, arranged to further include a plurality of electric power transmission lines that are connected to the respective plurality of secondary batteries. The controller may select the secondary battery to be charged by selecting an electric power transmission line to be connected to the secondary battery to be charged from among the plurality of electric power transmission lines.

The secondary battery system according to the first aspect of the present disclosure may be arranged such that the controller stops charging when a voltage of the secondary battery to be charged reaches a predetermined value in the step of charging.

This makes it possible to prevent overcharge of the secondary batteries, thereby preventing degradation of the secondary batteries.

The secondary battery system according to the first aspect of the present disclosure may be, for example, arranged such that an application duration of a charging current is set for one charge of each of the plurality of secondary batteries. The controller may, for example, stop charging when a voltage of the secondary battery to be charged reaches a predetermined value midway through the application duration in the step of charging.

This makes it possible to suppress overcharging with more certainty. Since an unnecessary charging time is avoided, it is possible to shorten the charging time of the secondary batteries.

The secondary battery system according to the first aspect of the present disclosure may be, for example, arranged to further include a voltage monitor that monitors a voltage of the secondary battery to be charged in accordance with the controller's selection of the secondary battery to be charged.

With this configuration, the secondary battery system may not have to include a plurality of voltage monitors that correspond to the respective plurality of secondary batteries. For example, a single voltage monitor can intermittently monitor the voltage of the whole secondary battery system.

The secondary battery system according to the first aspect of the present disclosure may be arranged, for example, to further include a temperature monitor that monitors a temperature of each of the plurality of secondary batteries. The controller may, for example, stop charging when a temperature of the secondary battery to be charged reaches a predetermined value in the step of charging.

This makes it possible to prevent the secondary battery from overheating, thereby preventing degradation of the secondary battery. Moreover, it is possible to shorten a time for charging the secondary batteries.

The secondary battery system according to the first aspect of the present disclosure may be, for example arranged such that the temperature monitor monitors the temperature of the secondary battery to be charged in accordance with the controller's selection of the secondary battery to be charged.

With this configuration, the secondary battery system may not have to include a plurality of temperature monitors that correspond to the respective plurality of secondary batteries. For example, a single temperature monitor can intermittently monitor the temperature of the whole secondary battery system.

The secondary battery system according to the first aspect of the present disclosure may be, for example, arranged to further include a plurality of housings containing the respective plurality of secondary batteries, and a housing monitor that monitors states of the plurality of housings. The controller may, for example, stop charging the secondary battery to be charged when an expansion deformation or an internal pressure of one of the plurality of housings that corresponds to the secondary battery to be charged reaches a predetermined value in the step of charging.

This makes it possible to prevent an excess increase in the pressure of the secondary battery, thereby preventing degradation of the secondary battery. Moreover, it is possible to shorten a time for charging the secondary batteries.

The secondary battery system according to the first aspect of the present disclosure may be, for example, arranged such that the housing monitor includes a sensor disposed on an outer wall of each of the plurality of housings. The sensor may be, for example, a location sensor, a piezoelectric sensor, or a sensor using a film or a wire rod in which a tensile break occurs in response to a predetermined tensile stress.

This makes it possible to accurately monitor the pressure of the secondary batteries, thereby preventing degradation of the secondary batteries.

A method according to the first aspect of the present disclosure for charging a plurality of secondary batteries includes a step (A) of intermittently charging each of the plurality of secondary batteries plural times with a pause between charges. Step (A) includes a step (a) of selecting a secondary battery to next be charged from among the plurality of secondary batteries and a step (b) of charging the secondary battery to be charged at a charging current. In step (A), step (a) and step (b) are repeated plural times while a secondary battery selected in step (a) is sequentially switched. The secondary battery to be charged has a property such that a charging capacity decreases by 20% from a maximum charging capacity in a case where the secondary battery to be charged is continuously charged at a standard current. The value of the charging current is not less than that of the standard current.

A secondary battery system according to the second aspect of the present disclosure includes a plurality of secondary batteries, and a controller that controls an operation of discharging the plurality of secondary batteries. The controller intermittently discharges each of the plurality of secondary batteries plural times with a pause between discharges while repeating a cycle including a step of selecting a secondary battery to next be discharged from among the plurality of secondary batteries and a step of drawing a discharging current from the secondary battery to be discharged. The secondary battery to be discharged has a property such that a discharging capacity decreases by 20% from a maximum discharging capacity in a case where the secondary battery to be discharged is continuously discharged at a standard current. A value of the discharging current is not less than that of the standard current.

According to this secondary battery system, a secondary battery to be discharged is discharged while being switched among a plurality of secondary batteries. With this configuration, the secondary battery system may not have to include a plurality of controllers each corresponding to the plurality of the secondary batteries. It is therefore possible to simplify the configuration of the system.

In a case where the discharging current satisfies the above condition, the plurality of secondary batteries can be rapidly discharged. Moreover, it is possible to obtain a high discharging capacity.

The secondary battery system according to the second aspect of the present disclosure may be, for example, arranged such that the controller does not concurrently discharge two or more of the plurality of secondary batteries.

This makes it possible to prevent a short circuit among the plurality of secondary batteries, thereby preventing degradation of the secondary batteries.

The secondary battery system according to the second aspect of the present disclosure may be, for example, arranged to further include a plurality of electric power transmission lines connected to the respective plurality of secondary batteries. The controller may, for example, select the secondary battery to be discharged by selecting an electric power transmission line to be connected to the secondary battery to be discharged from among the plurality of electric power transmission lines.

The secondary battery system according to the second aspect of the present disclosure may be, for example, arranged such that the controller stops discharging when a voltage of the secondary battery to be discharged reaches a predetermined value in the step of discharging.

This makes it possible to prevent overdischarging of the secondary battery, thereby preventing degradation of the secondary battery.

For example, a drawing time of a discharging current from each of the plurality of secondary batteries per one discharging may be set. The controller may, for example, stop discharging when the voltage of the secondary battery to be discharged reaches the predetermined value midway through the drawing time in the step of discharging. This makes it possible to suppress overcharging with more certainty. Since an unnecessary drawing time is avoided, the drawing time of the secondary battery can be shortened.

The secondary battery system according to the second aspect of the present disclosure may be, for example, arranged to further include a voltage monitor that monitors the voltage of the secondary battery to be discharged in accordance with the controller's selection of the secondary battery to be discharged.

With this configuration, the secondary battery system may not have to include a plurality of voltage monitors that correspond to the respective plurality of secondary batteries. For example, a single voltage monitor can intermittently monitor the voltage of the whole secondary battery system.

The secondary battery system according to the second aspect of the present disclosure may be, for example, arranged to further include a temperature monitor that monitors a temperature of each of the plurality of secondary batteries. The controller may, for example, stop discharging when a temperature of the secondary battery to be discharged reaches a predetermined value in the step of discharging.

This makes it possible to prevent an excess increase in the temperature of the secondary battery, thereby suppressing degradation of the secondary battery. Moreover, it is possible to stabilize the discharging current of the secondary battery.

The secondary battery system according to the second aspect of the present disclosure may be, for example, arranged such that the temperature monitor monitors the temperature of the secondary battery to be discharged in accordance with the controller's selection of the secondary battery to be discharged.

With this configuration, the secondary battery system may not have to include a plurality of temperature monitors that correspond to the respective plurality of secondary batteries. For example, a single temperature monitor can intermittently monitor the temperature of the whole secondary battery system.

The secondary battery system according to the second aspect of the present disclosure may be, for example, arranged to further include a plurality of housings containing the respective plurality of secondary batteries, and a housing monitor that monitors the states of the plurality of housings. The controller may, for example, stop discharging the secondary battery to be discharged when an expansion deformation or an internal pressure of one of the plurality of housings that corresponds to the secondary battery to be discharged reaches a predetermined value in the step of discharging.

This makes it possible to prevent an excess increase in the pressure of the secondary battery, thereby preventing degradation of the secondary battery. Moreover, it is possible to stabilize the discharging current of the secondary battery.

The secondary battery system according to the second aspect of the present disclosure may be, for example, arranged such that the housing monitor includes a sensor disposed on an outer wall of each of the housings. The sensor may be, for example, a location sensor, a piezoelectric sensor, or a sensor using a film or a wire rod in which a tensile break occurs in response to a predetermined tensile stress.

This makes it possible to accurately monitor the pressure of the secondary battery, thereby preventing degradation of the secondary battery.

The secondary battery system according to the second aspect of the present disclosure may be, for example, arranged to further include a capacitor that is capable of receiving electricity from the plurality of secondary batteries and supplying electricity to a load.

This makes it possible to improve the stability of the discharging current at the time of switching of the secondary battery.

In the step of selecting the secondary battery to be discharged, connection between the discharged secondary battery and the load may be cut, and a secondary battery to next be discharged may be connected to the load while maintaining connection between the capacitor and the load.

This makes it possible to improve the stability of the discharging current at the time of switching of the secondary battery.

A method according to the second aspect of the present disclosure for discharging a plurality of secondary batteries includes a step (A) of intermittently discharging each of the plurality of secondary batteries plural times with a pause between discharges. Step (A) includes a step (a) of selecting a secondary battery to next be discharged from among the plurality of secondary batteries and a step (b) of drawing a discharging current from the secondary battery to be discharged. In step (A), step (a) and step (b) are repeated plural times while a secondary battery selected in step (a) is sequentially switched. The secondary battery to be discharged has a property such that a discharging capacity decreases by 20% from a maximum discharging capacity in a case where the secondary battery to be discharged is continuously discharged at a standard current. The value of the discharging current is not less than that of the standard current.

Various embodiments are described below in detail with reference to the drawings. Note that the following embodiments are merely examples, and the present disclosure is not limited to the following embodiments. In the following description, identical members are given identical reference numerals and are not explained repeatedly.

Embodiment 1

[Secondary Battery System]

Figure 1A:
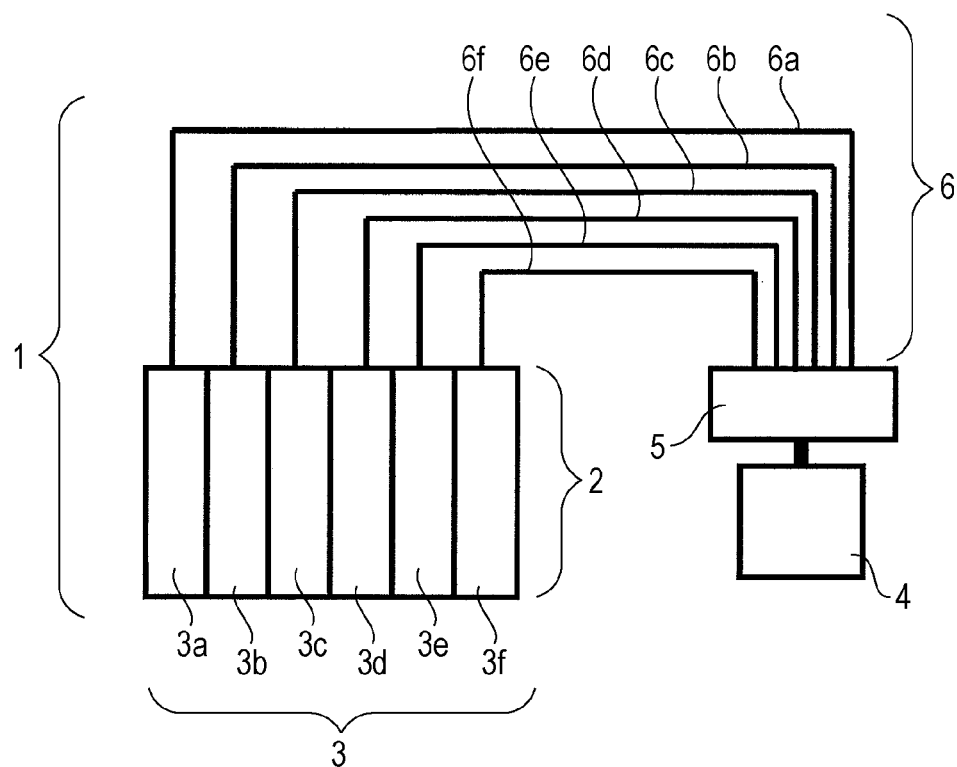
FIG. 1A is a schematic view illustrating an example of a configuration of a secondary battery system according to Embodiment 1.
Figure 1B:
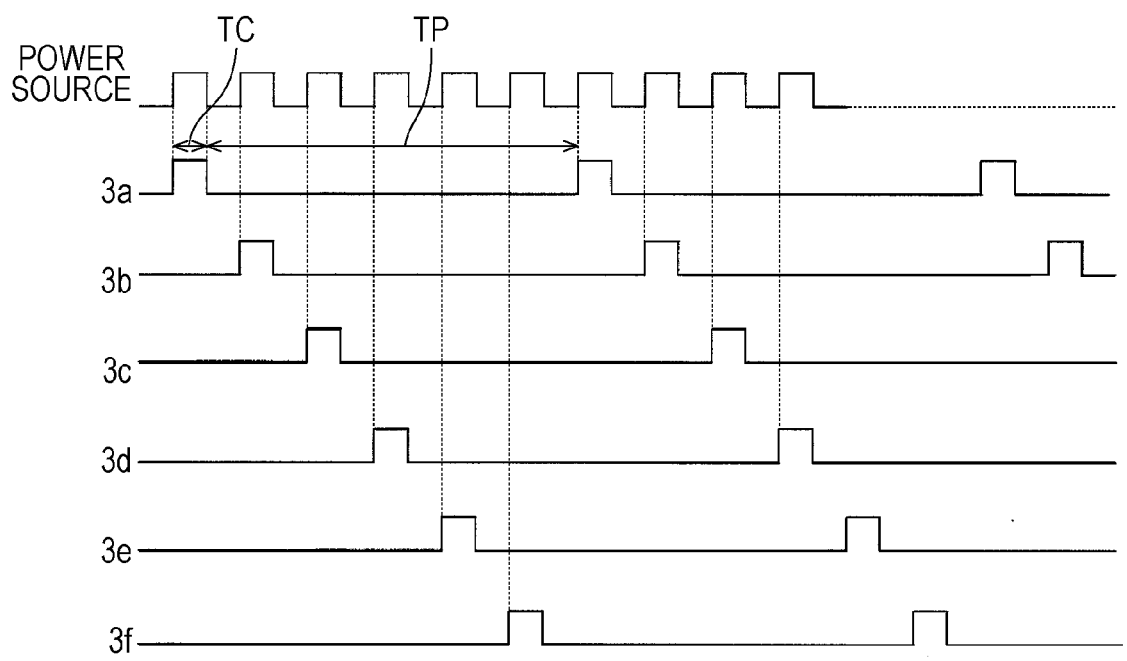
FIG. 1B illustrates a timing diagram of charge in the secondary battery system.

FIGS. 1A and 1B are schematic views illustrating an example of a configuration of a secondary battery system according to Embodiment 1. A secondary battery system 1 illustrated in FIGS. 1A and 1B includes a secondary battery section 2 that includes a plurality of secondary batteries 3, a power source 4 that charges the plurality of secondary batteries 3, a controller 5, and a plurality of electric power transmission lines 6. The number of secondary batteries 3 that constitutes the secondary battery section 2 is not limited. In the example illustrated in FIGS. 1A and 1B, the secondary battery section 2 includes six secondary batteries 3. Hereinafter, these six secondary batteries 3 are referred to as a first secondary battery 3a, a second secondary battery 3b, a third secondary battery 3c, a fourth secondary battery 3d, a fifth secondary battery 3e, and a sixth secondary battery 3f. Each of the secondary batteries 3 may include a plurality of cells that are connected in series or in parallel or may be constituted by a single cell. The number of cells may differ between secondary batteries.

The secondary battery section 2 of the present embodiment is constituted by an assembly of the plurality of secondary batteries 3. Each of the secondary batteries 3 includes a positive electrode that contains a positive-electrode active material, a negative electrode that contains a negative-electrode active material, and an electrolyte disposed between the positive electrode and the negative electrode. Examples of the positive-electrode active material layer encompass lithium cobalt oxide, lithium nickel oxide, lithium manganese oxide, lithium iron phosphate, and lithium composite metal oxide that contains cobalt, nickel, and manganese. The positive-electrode active material layer may include, as needed, a conducting assistant, a binder, and the like. Examples of the negative-electrode active material layer encompass graphite, lithium, silicon, silicon compounds, and tin compounds. The negative-electrode active material layer may include, as needed, a conducting assistant, a binder, and the like. Examples of the electrolyte encompass an electrolytic solution, which is obtained by dissolving an electrolyte salt in a solvent, and a solid electrolyte. In a case where the electrolyte is an electrolytic solution, each of the secondary batteries 3 may include a separator. Examples of a separator material are a porous film and a non-woven fabric. The materials of which each of the secondary batteries 3 of the present embodiment are made are not limited to these examples. Furthermore, movable ions that cause secondary battery reaction are not limited to lithium ions, and may be, for example, sodium ions. The secondary battery reaction may be, for example, caused by a plurality of electrons.

The power source 4 supplies a current for charging the secondary batteries 3. In this example, a single power source 4 is provided for the plurality of secondary batteries 3. The plurality of electric power transmission lines 6 are provided between the power source 4 and the secondary batteries 3. The plurality of electric power transmission lines 6 supply a current to the corresponding secondary batteries 3, respectively. In this example, the plurality of electric power transmission lines 6 are made up of six electric power transmission lines 6a to 6f. The electric power transmission line 6a is provided between the first secondary battery 3a and the power source 4. Similarly, each of the electric power transmission lines 6b to 6f is provided between a corresponding one of the secondary batteries 3b to 3f and the power source 4. Note that the electric power transmission lines 6 are not limited in particular, provided that the electric power transmission lines 6 can conduct electricity to a selected one of the plurality of secondary batteries 3. The number and configuration of electric power transmission lines 6 are not limited to those illustrated in FIGS. 1A and 1B. For example, the power source 4 may perform wireless power transfer to the secondary batteries 3. The electric power transmission lines 6 may be a plurality of cables. For example, the electric power transmission lines 6 may be a plurality of cables in order to monitor the voltage or temperature of the secondary batteries 3. The electric power transmission lines 6 may be multicore cables.

The controller 5 controls an operation for charging the plurality of secondary batteries 3. The controller 5 repeatedly charges each of the plurality of secondary batteries 3 with a pause between charges. The value of the charging current is set to a value such that a high charging capacity cannot be obtained if continuous charging is performed at this current. Specifically, the value of the charging current is set to a value such that the charging capacity decreases by 20% or more from a maximum charging capacity if continuous charging is performed at this current. The maximum charging capacity corresponds to a charging capacity obtained in a case where a target secondary battery is continuously charged at a sufficiently low current. In other word, the value of the charging current of the present embodiment is higher than a current value typically set in continuous charging.

As described above, a secondary battery can achieve a maximum charging capacity when continuously charged at a sufficiently low current, and the charging capacity becomes smaller as the charging current becomes higher. In such continuous charge, a current value at which the charging capacity decreases by 20% from the maximum charging capacity is referred to as a "current value s1". The charging current of the present embodiment is set to not less than the current value s1. The charging current may be set to a current such that the charging capacity decreases by 50% or 70% from the maximum charging capacity in continuous charge in order to achieve higher-speed charge. The charging current may be set to not less than a current value s2 at which the charging capacity markedly decreases in continuous charge. The charging current may be set to 5 or more times a recommended charging current, in the continuous charging, of the secondary battery or may be set to 10 or more times the recommended charging current, in the continuous charging, of the secondary battery. The charging current may be, for example, set so that an average charging current is not more than the current value s1 or not more than the current value s2. The average charging current is the temporal average of values of the charging current during a total time of an application duration and a pause.

Note that the decrease of the charging capacity caused by the increase of the charging current is considered to be because ions cannot be sufficiently diffused in the case of charge using a high current. Therefore, a secondary battery in which ions cause electric conduction can have a property such that the charging capacity decreases as the charging current becomes higher. Note, however, that the current value s1 and the current value s2 may vary depending on the materials of the secondary battery, and thickness of an active material layer, for example. The current value s1, which varies depending on the secondary battery 3 to be charged, may be supplied to the controller 5. In a case where the plurality of secondary batteries 3 include secondary batteries whose battery materials or the like are different, current values s1 suitable for the respective secondary batteries may be supplied to the controller 5.

The controller 5 selectively switches a secondary battery to which a charging current is applied among the plurality of secondary batteries 3. Specifically, while a charging current is being applied to a selected one of the secondary batteries 3, the controller 5 stops charging the other secondary batteries 3. For example, the controller 5 includes a selection controller and switching circuitry.

The selection controller selects a secondary battery 3 to be connected to the power source 4 from among the plurality of secondary batteries 3. The selection controller is, for example, a programmable controller using a sequencer, a relay sequencer, and a computer.

The switching circuitry switches connection between the electric power transmission line 6 and the power source 4 so as to connect, to the power source 4, the electric power transmission line 6 connected to a selected secondary battery 3. The "connection" as used herein refers to a state of electrical connection. For example, in a case where each of the electric power transmission lines 6 is provided with a switch, the "connection" refers to a state where the switch is on. Examples of the switching circuitry encompass switchers using various types of couplers such as a mechanical relay, a solid state relay, or an optical coupler and wireless power-feeding type connectors.

The controller 5 may further include a monitor that measures the voltages of the secondary batteries 3. In this case, the selection controller may select a secondary battery 3 to be connected to the power source 4 on the basis of the battery voltages measured by the monitor.

The controller 5 switches the secondary battery 3 to be connected to the power source 4 on the basis of the voltage of the secondary battery 3 that is being charged. For example, the controller 5 monitors the voltage of the secondary battery 3 that is being charged. When the voltages reaches a predetermined value as a result of the progress of charge, the controller 5 stops charging the secondary battery 3 that is being charged and switches the secondary battery 3 to another secondary battery 3 to be charged.

The controller 5 may include, for example, a voltage monitor in order to monitor the voltages of the secondary batteries 3. The controller 5 may not include a plurality of voltage monitors corresponding to the respective plurality of secondary batteries 3. A single voltage monitor may intermittently and in rotation monitor the voltages of all of the secondary batteries 3. This makes it possible to prevent degradation of the secondary batteries 3.

The controller 5 may set an application duration TC in which a charging current is applied to each secondary battery. In this case, the controller 5 may stop charging after elapse of the set application duration TC from start of application of a charging current to a selected secondary battery 3. Then, the controller 5 may switch the charged secondary battery 3. The controller 5 may stop charging after the voltage of the secondary battery 3 that is being charged reaches a predetermined value and before elapse of the set application duration TC.

Next, an example of a charging operation of the secondary battery system 1 is described.

FIG. 1B is a timing diagram for explaining an example of a charging operation of the secondary battery system 1. First, a first secondary battery 3a is selected. The selected first secondary battery 3a and the power source 4 are electrically connected to each other. The first secondary battery 3a is charged at a charging current whose value is not less than the current value s1 during a predetermined application duration TC. The application duration TC is a charging time per charge. Next, a second secondary battery 3b is selected. The second secondary battery 3b and the power source 4 are electrically connected to each other. Similarly, the charging current is applied to the second secondary battery 3b. This is repeated until the charging current is applied to a sixth secondary battery 3f. Then, the first secondary battery 3a is selected again, and the second charge is performed. In this way, each of the secondary batteries 3 is charged plural times with a pause TP in between. As is clear from FIG. 1B, during charge of one secondary battery 3, charge of the other secondary batteries 3 is stopped.

In FIG. 1B, the power source 4 supplies a current to one secondary battery 3 plural times with a pause between supplies. The power source 4 may supply a current to the plurality of secondary batteries 3 in rotation. For example, the power source 4 may continuously supply a current to the secondary battery section 2 and sequentially switch connection between the power source 4 and each of the secondary batteries 3. The controller 5 may control the application duration TC by controlling each connection time.

The application duration TC in one charge is a time in which a charging current whose value is not less than the current value s1 is continuously applied to a secondary battery 3 to be charged. The application duration TC is not limited in particular. For example, the application duration TC may be shorter than a time in which the charging capacity of the secondary battery 3 decreases by 20% or more from the maximum charging capacity if the secondary battery 3 is continuously charged. The application duration TC may be, for example, less than one hour. The application duration TC may be, for example, within five minutes. In this case, a decrease in charging capacity can be more effectively suppressed. The application duration TC may be, for example, within one minute or within thirty seconds. Meanwhile, in order to suppress a loss at the time of switching and an energy loss caused by a high-frequency component, the application duration TC may be, for example, one or more seconds, ten or more seconds, or thirty or more seconds.

The pause TP is not limited in particular. The pause TP may be, for example, three or more seconds or thirty or more seconds. This makes it possible to achieve a time for movement of ions. The pause TP may be, for example, five or more minutes. The pause TP may be two or more times the application duration TC or may be five or more times the application duration TC. In a case where N secondary batteries 3 are charged, the pause TP may be N or more times the application duration TC.

An average charging current value may be set to not more than the current value s2. Alternatively, the average charging current value may be set to not more than the current value s1. In a case where the average charging current value is kept not more than a predetermined current value, it is possible to obtain a high charging capacity with more certainty.

The controller 5 may switch the secondary battery 3 not only on the basis of the application duration TC, but also on the basis of the voltage of the secondary battery 3 that is being charged. The controller 5 may, when the voltage of the charged secondary battery 3 reaches a predetermined value, stop charging the secondary battery 3 that is being charged and switch the charged secondary battery 3 to another one even if the set application duration TC has not elapsed. In a case where charge is stopped at a time point when an application time TC' is elapsed, the application time TC' may be shorter than an application time TC in previous charge of the same secondary battery 3, as illustrated in FIGS. 2A and 2B. Note that in a case where charge is stopped midway through the application duration TC, charge of a next secondary battery 3 may be started after elapse of the application duration TC as illustrated in FIG. 2A. This makes it slightly easier to control the secondary battery system 1. Alternatively, charge of a next secondary battery may be started immediately after stop of charge midway through the application duration TC as illustrated in FIG. 2B. This makes it possible to shorten a total charging time of the secondary battery section 2. The "total charging time" refers to a time from the start of initial charge to full charge of all of the secondary batteries 3.

Since charge is stopped on the basis of a result of monitoring of the voltage of the secondary battery 3 that is being charged, it is possible to suppress overcharge, thereby suppressing degradation of the secondary batteries 3. For example, even in a case where a charging time in one charge is relatively long, overcharge can be suppressed with more certainty. In other words, the application duration TC of the charging current can be set to a relatively long time. It is therefore possible to reduce the number of times of switching of the charged secondary battery 3. As a result, a loss of a switching time and contact degradation caused by switching can be suppressed.

For example, a secondary battery 3 that has reached a predetermined voltage may be intermittently charged in a shorter application duration TC. This makes it possible to increase the charging capacity little by little. In this case, the application duration TC may be set to two or less seconds or may be one or less seconds after the voltage of the secondary battery 3 reaches the predetermined voltage. The application duration TC may be continuously changed in accordance with a change of the voltage of the secondary battery 3. Whether the secondary battery 3 that has reached the predetermined value is further charged or the charge is finished may be determined when this secondary battery 3 is selected next. This determination may be made in accordance with the voltage of this secondary battery 3. In a case where the secondary battery 3 that has reached the predetermined value is further charged, the number of times of charge may be set in advance. Alternatively, whether or not additional charge is performed may be determined in accordance with whether or not the voltage of the secondary battery 3 has reached a threshold value that is larger than the predetermined value.

For example, it is possible that the secondary battery section 2 be a single secondary battery pack and the plurality of secondary batteries 3 be battery units or capacity units that constitute the secondary battery pack. In this case, since the plurality of battery units are separately charged, the safety improves and resources can be effectively utilized. For example, in a case where a battery unit becomes defective because of degradation, damage, or the like, the secondary battery system 1 may operate by cutting off only the defective unit. Alternatively, a person who uses or manages the secondary battery system 1 may repair only the defective battery unit.

According to the secondary battery system 1 of the present embodiment, each of the secondary batteries 3 is charged at a high charging current plural times with a pause between charges. This makes it possible to achieve a high charging capacity in a short time. Furthermore, in a case where a current from a single power source 4 is sequentially distributed to the plurality of secondary batteries 3, the system can be simplified, and the cost of the system can be reduced.

The controller 5 may monitor the temperature of each of the secondary batteries 3. The controller 5 may include, for example, a temperature monitor. This makes it possible to prevent overheating of the secondary batteries 3. A plurality of temperature monitors may be provided for the respective secondary batteries 3. A single temperature monitor may monitor the temperature of the plurality of secondary batteries 3. A similar method to the voltage monitoring may be employed as a method for switching a charged target in a case where the temperature of the secondary battery 3 that is being charged has reached a predetermined temperature.

The controller 5 may monitor an expansion deformation or an internal pressure in respective housings which contain the secondary batteries 3. The controller 5 may include, for example, a housing monitor. This suppresses the damage on the housings, thereby preventing degradation of the secondary batteries 3. The housing monitor may include a sensor. Examples of the sensor encompass a location sensor, a piezoelectric sensor, and a film and a wire rod in which a tensile break occurs. A similar method to the voltage monitoring may be employed as a method for switching a charged target in a case where an expansion deformation or an internal pressure of the secondary battery 3 that is being charged has reached a predetermined degree or more.

In order to achieve the aforementioned various kinds of switching control, the controller 5 may include a device for measurement control. Examples of the device for measurement control encompass a timer, a voltage monitor, a temperature monitor, and an expansion monitor.

[Method for Charging Plurality of Secondary Batteries]

A method for charging a plurality of secondary batteries of the present embodiment is described with reference to the drawings.

FIG. 3 is a flow chart illustrating an example of the method for charging a plurality of secondary batteries. In the following description, an example in which N secondary batteries are charged is described.

In Step S1, a first secondary battery is selected from among the plurality of secondary batteries. In Step S2, a charging current is applied to the selected secondary battery. The value of the charging current is a value at which the charging capacity decreases by 20% or more from the maximum charging capacity if the selected secondary battery is continuously charged at this current. Charge is stopped, for example, after elapse of the predetermined application duration TC. Stoppage of charge means stoppage of application of a predetermined charging current to a secondary battery. In Step S3, a secondary battery that is different from the secondary battery selected in Step S1 is selected as a second secondary battery. In other words, a secondary battery to be charged is switched. At the time of switching, electricity is not concurrently conducted to two or more of the plurality of secondary batteries. Subsequently, the second secondary battery selected in Step S3 is charged in a similar manner to Step S2. Then, a secondary battery that is different from the secondary batteries selected in Step S1 and Step 3 is selected as a third secondary battery. This is repeated until a N-th secondary battery is charged. Then, the first secondary battery is selected again. In this way, each of the secondary batteries is charged plural times with a pause between charges.

In Step S2, the voltage of the secondary battery that is being charged may be monitored. In this case, charge may be stopped when the voltage reaches a predetermined voltage value. The predetermined voltage value for stopping charge may be, for example, determined in advance in accordance with the specification of the secondary battery. In a case where the secondary battery includes a positive electrode made of lithium cobalt oxide and a negative electrode made of graphite, this voltage is, for example, 4.2 V.

In Step S2, the temperature of the secondary battery that is being charged may be monitored. In this case, charge may be stopped when the temperature reaches a predetermined temperature. The predetermined temperature for stopping charge may be, for example, determined in advance in accordance with the materials that constitute the secondary battery or the size of the secondary battery. This temperature may be, for example, 40° C. in a case where the secondary battery includes a metallic can or a laminate exterior package.

In Step S2, an expansion deformation or an internal pressure of a housing in which the secondary battery that is being charged is contained may be monitored. In this case, charge may be stopped when the expansion deformation or the internal pressure reaches a predetermined value. The predetermined value for stopping charge can be appropriately set in accordance with the material and shape of the housing. For example, charge may be stopped when the housing expands by 10% or when the internal pressure of the housing increases by 20%.

Note that although the voltage, temperature, expansion deformation, or internal pressure of the secondary battery that is being charged is monitored in Step S2 in the flow chart illustrated in FIG. 3, none of these may be monitored, or at least one of these may be monitored.

The charging method described above may be performed, for example, by a charging device including a controller that controls a charging operation. The configuration and operation of the controller within the charging device are similar to those of the controller 5 of the secondary battery system 1, and are therefore not described in detail. The charging device may include a power source or may charge a secondary battery with a current supplied from an external power source. The charging device may include a plurality of connection terminals respectively connectable to secondary batteries. The charging device may include a terminal to be connected to an external power source.

The inventors of the present invention studied, for each of three types of cells A, B, and C for evaluation, a relationship between a charging current and a charging capacity and thus confirmed the effects of the present embodiment.

[Study on Method for Charging Cell A]

The cell A was prepared. A positive electrode of the cell A was obtained by forming a coating film containing a positive-electrode active material, a conducting assistant, and a binder onto an aluminum foil. The thickness of the aluminum foil was 15 µm. The positive-electrode active material was a complex oxide of Ni, Co, and Mn that contains lithium. The thickness of the coating film was 50 µm. A negative electrode of the cell A was obtained by pressing a lithium metal foil on a copper electrode and bonding them. The thickness of the lithium metal foil was 300 µm. Two porous separators were disposed between the positive electrode and the negative electrode. The thickness of each of the separators was 20 µm. A space between the positive electrode and the negative electrode was filled with an electrolytic solution dissolved in a non-aqueous solvent. The electrolytic solution contained $LiPF_6$ of 1 mol/L.

Figure 4:
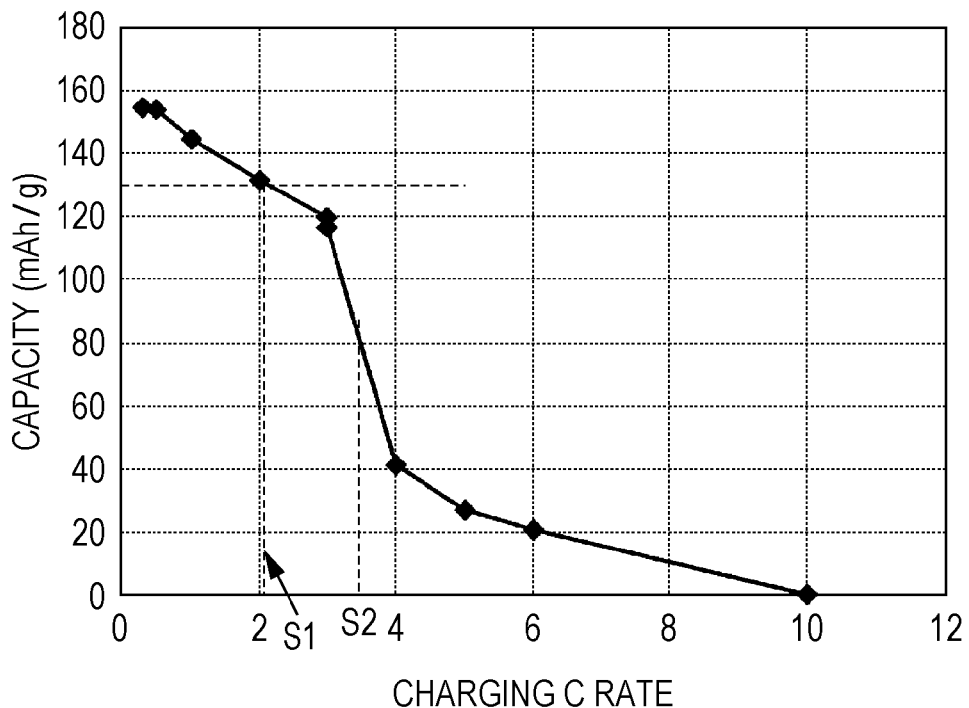
FIG. 4 is a view illustrating an example of a relationship between a charging current and a charging capacity in continuous charge of a cell.

Next, the cell A was continuously charged at a direct constant current of various values. FIG. 4 illustrates an example of a relationship between a charging current and a charging capacity in continuous charge of the cell A.

As illustrated in FIG. 4, in continuous charge, the charging capacity decreased as the charging current increased. In FIG. 4, the charging current need be kept, for example, approximately 2 C or less in order to obtain the maximum charging capacity or a charging capacity close to the maximum charging capacity. In a case where the cell A is continuously charged at a charging current of 4 C, only a charging capacity that is approximately 25% of the maximum charging capacity (approximately 150 to 160 mAh/g in FIG. 4) can be obtained. Note that "1 C" denotes a current value that corresponds to a charge amount per one hour that flows to a secondary battery in a case where the secondary battery is continuously charged to its full charging capacity at a low current. The charging current becomes larger as the value of C becomes larger. For example, charge at 0.1 C means charge of such a current that a full charging capacity is reached in ten hours.

In FIG. 4, the charging current need be set to a low current such as less than 2 C in order to obtain a capacity of more than 80% of the maximum charging capacity by continuously charging the cell A. Therefore, it takes a long time to fully charge all of the plurality of secondary batteries.

In FIG. 4, in a case where the cell A was continuously charged at a direct constant current, the current value s1 at which the charging capacity decreased by 20% from the maximum charging capacity was approximately 2 C, and the current value s2 at which the charging capacity markedly decreased was approximately 3.5 C. Note that the current value s2 may be, for example, a current value at which the inclination of the graph illustrated in FIG. 4 becomes maximum. In other words, the current value s2 may be a current value at which $\Delta C_A/\Delta I$ becomes maximum where $C_A$ is a charging capacity and I is a charging current.

Figure 5:
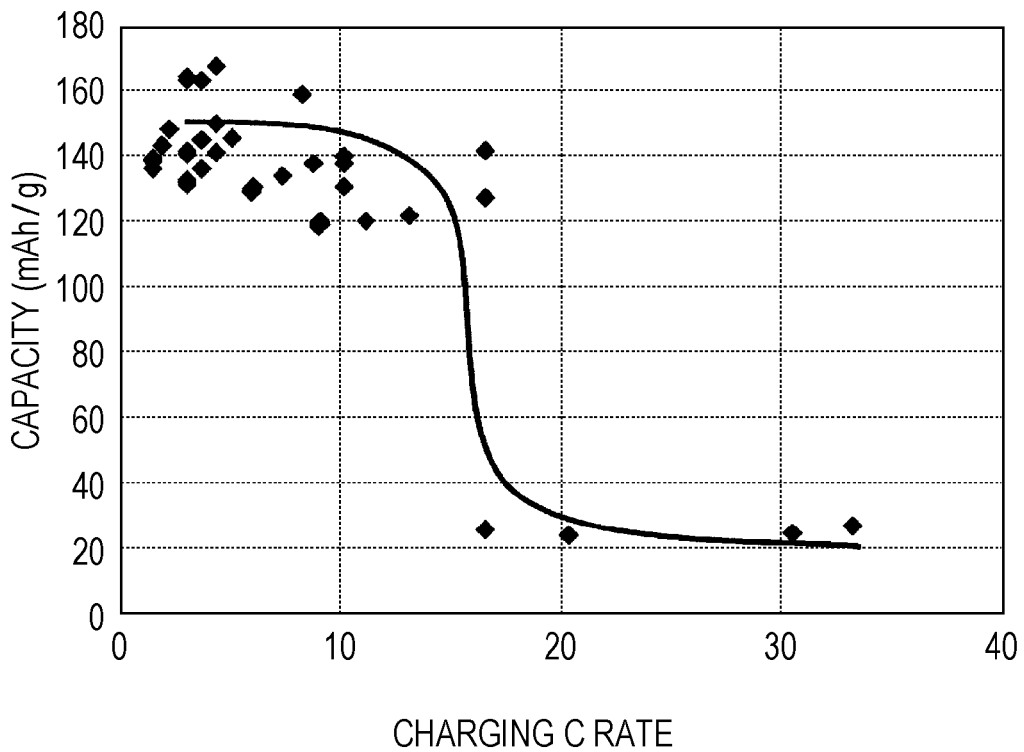
FIG. 5 is a view illustrating an example of a relationship between a charging current and a charging capacity in intermittent charge of a cell.

Next, the cell A was intermittently charged at a charging current of various values with a pause between charges. In the intermittent charge, the application duration TC of the charging current was 10 seconds, and the pause TP was 90 seconds. FIG. 5 illustrates an example of a relationship between a charging current and a charging capacity in intermittent charge of the cell A.

As illustrated in FIG. 5, according to the intermittent charge, a higher charging capacity was obtained at each charging current value than the continuous charge. For example, in a case where the cell A was intermittently charged at a charging current that is not less than the current value s1 or not less than the current value s2 illustrated in FIG. 4, a sufficient charging capacity was achieved. In the example illustrated in FIG. 5, even in a case where the charging current was a high current of approximately 2 C to 12 C, a charging capacity that is approximately 80% of the maximum charging capacity was obtained. Therefore, it was confirmed that a high charging capacity was obtained by intermittently charging each of the secondary batteries at a current that is not less than the current value s1 or not less than the current value s2.

Figure 6:
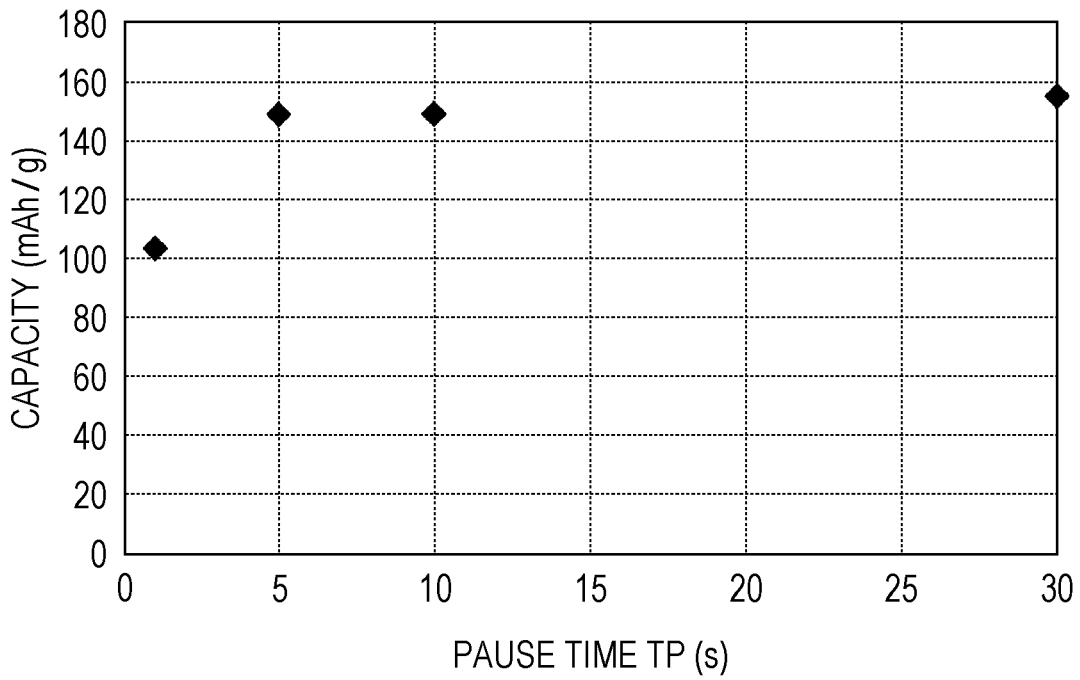
FIG. 6 is a view illustrating an example of a relationship between a pause and a charging capacity in intermittent charge of a cell.

FIG. 6 illustrates an example of a relationship between the pause TP and the charging capacity in a case where the cell A was intermittently charged. The cell A was charged by fixing the application duration TC to 10 seconds, fixing the charging current to 3 C, and changing the pause TP.

As illustrated in FIG. 6, in a case where the pause TP was 5 or more seconds, a high charging capacity that is substantially equivalent to the maximum charging capacity was obtained. In this case, a temporal average charging current was 2 C according to the following equation:

$$(I \times TC)/(TC+TP)=(3\ C \times 10\ \text{sec})/(10\ \text{sec}+TP\ (\text{sec}))=2\ (C)$$

This average charging current was almost equal to the current value s1 illustrated in FIG. 4. This shows that a high charging capacity can be obtained with more certainty by setting the application duration TC, the pause TP, and the charging current so that the average charging current becomes not more than the current value s1.

Note that a similar result was obtained even in a case where the application duration and the charging current are different (not illustrated). For example, a similar result was obtained in a case where the application duration was five seconds and the charging current was 6 C.

[Study on Method for Charging Cell B]

The cell B whose active material is different from that of the cell A was prepared. The active material of the cell B was Co oxide containing lithium. The thickness of a coating film containing a positive electrode active material, a conducting assistant, and a binder was 38 µm. The other features of the cell B were similar to those of the cell A.

Figure 7:
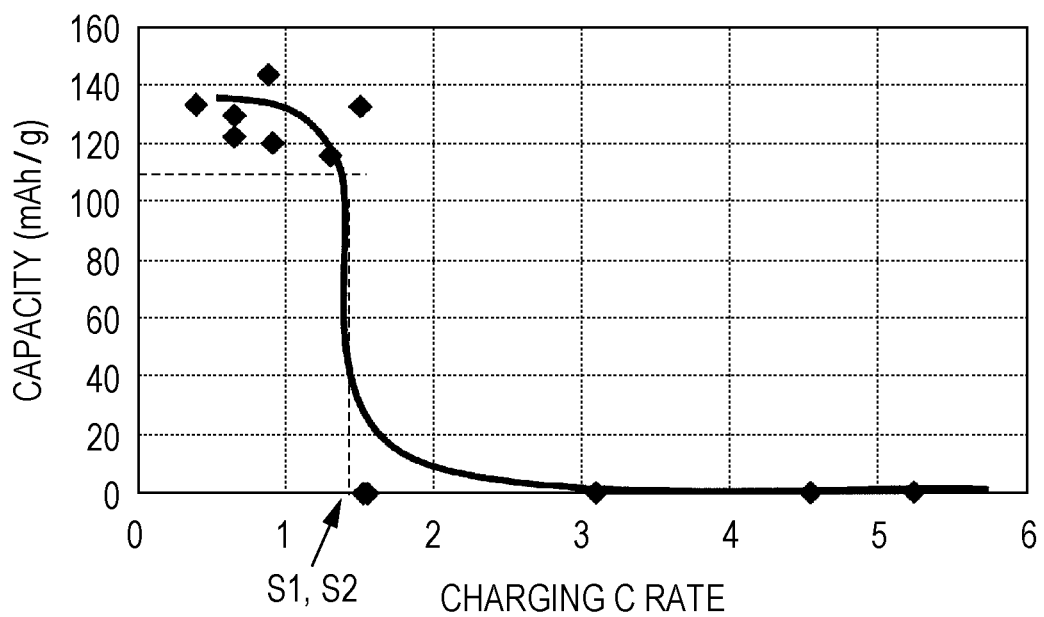
FIG. 7 is a view illustrating an example of a relationship between a charging current and a charging capacity in continuous charge of a cell.

Next, the cell B was continuously charged at a direct constant current of various values. FIG. 7 illustrates an example of a relationship between a charging current and a charging capacity in the continuous charge of the cell B.

As illustrated in FIG. 7, in the continuous charge, the charging capacity decreased as the charging current increased. In FIG. 7, the charging current need be kept, for example, approximately 1.5 C or less in order to obtain a maximum charging capacity or a high charging capacity close to the maximum charging capacity. In a case where the cell B is continuously charged at 3 C, only a charging capacity that is 5% or less of the maximum charging capacity (approximately 130 to 140 mAh/g in FIG. 7) was obtained.

In FIG. 7, the charging current need be set to a low current such as less than 1.5 C in order to obtain a capacity that is 80% or more of the maximum charging capacity by continuously charging the cell B. Therefore, it takes a long time to fully charge all of the plurality of secondary batteries.

In the example illustrated in FIG. 7, both of the current value s1 at which the charging capacity decreased by 20% or more from the maximum charging capacity and the current value s2 at which the charging capacity markedly decreased were approximately 1.5 C.

Figure 8:
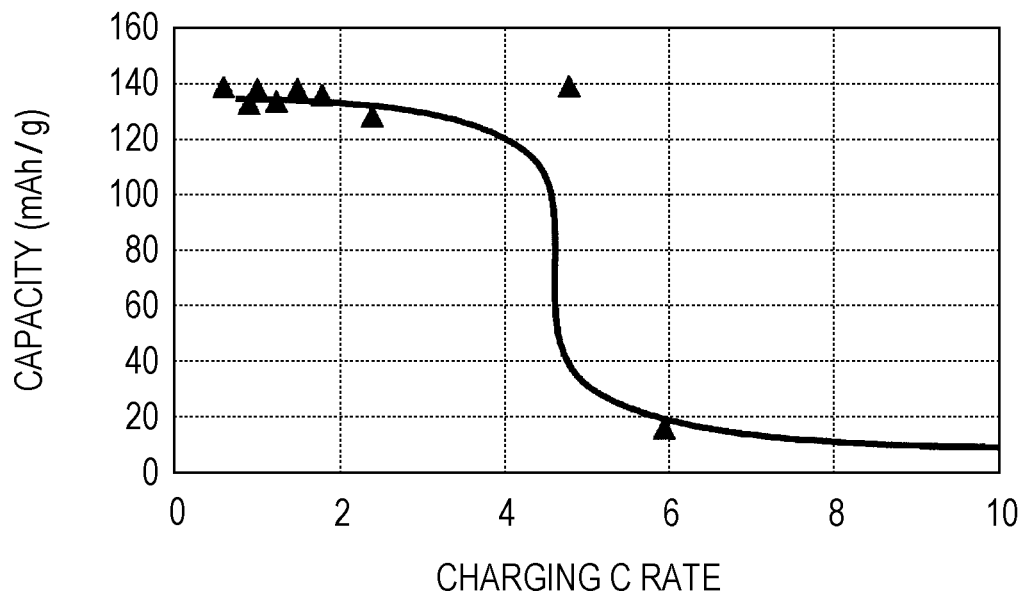
FIG. 8 is a view illustrating an example of a relationship between a charging current and a charging capacity in intermittent charge of a cell.

Next, the cell B was intermittently charged at a charging current of various values with a pause between charges. In the intermittent charge, the application duration TC of the charging current was 10 seconds, the pause TP was 90 seconds. FIG. 8 illustrates an example of a relationship between a charging current and a charging capacity in the intermittent charge.

As illustrated in FIG. 8, according to the intermittent charge, a higher charging capacity was obtained at each charging current value than in the continuous charge. For example, in a case where the cell B was intermittently charged at a charging current that is not less than the current value s1 or not less than the current value s2 illustrated in FIG. 7, a sufficient charging capacity was achieved. In the example illustrated in FIG. 8, a charging capacity that is approximately 80% of the maximum charging capacity was obtained even in a case where the charging current is a high current of approximately 1.5 C to 2.5 C. Therefore, it was confirmed that a high charging capacity was obtained by intermittently charging each of the secondary batteries at a current that is not less than the current value s1 or not less than the current value s2.

Figure 9:
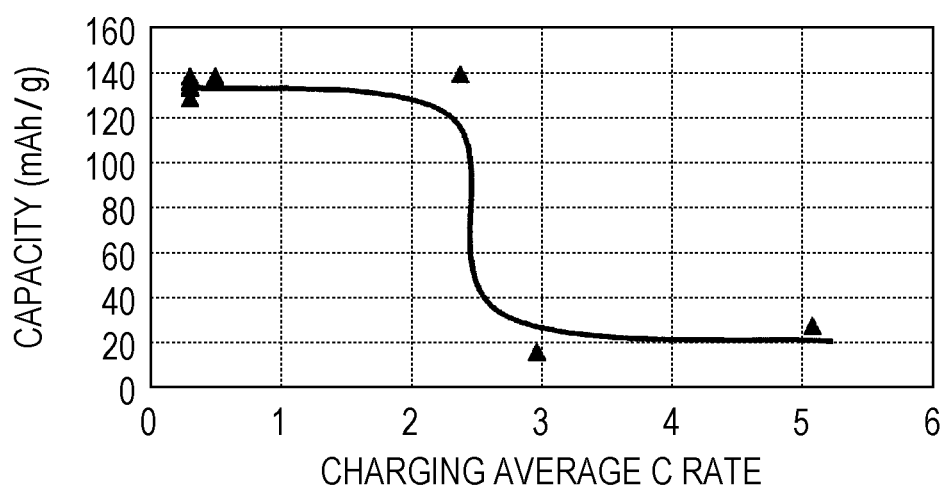
FIG. 9 is a view illustrating an example of a relationship between an average charging current and a charging capacity in intermittent charge of a cell.

FIG. 9 illustrates an example of a relationship between an average charging current value and a charging capacity in the intermittent charge. The cell B was charged while fixing the application duration TC to ten seconds and changing the value of charging current and the length of the pause TP. The average charging current value indicated by the horizontal axis of FIG. 9 is the average of values of a pulsed charging current applied to one secondary battery during a total time of an application duration and a pause.

As illustrated in FIG. 9, in a case where the average charging current value was less than 2.5 C, a high charging capacity equivalent to a charging capacity (see FIG. 7) obtained in a case where the cell B was continuously charged with a low current of 1.5 C or less was obtained. Therefore, according to the method for charging of the present embodiment, a plurality of secondary batteries can be efficiently charged.

[Study on Method for Charging Cell C]

The cell C whose negative electrode material is different from that of the cell B was prepared. The active material of the cell C was an oxide of Ni, Co, and Al that contains lithium. The thickness of a coating film containing a positive-electrode active material, a conducting assistant, and a binder was 135 µm. The negative electrode was made of carbon, and the thickness of the negative electrode was 150 µm. The thickness of each separator was 30 µm. The other features of the cell C were similar to those of the cell B.

Figure 10:
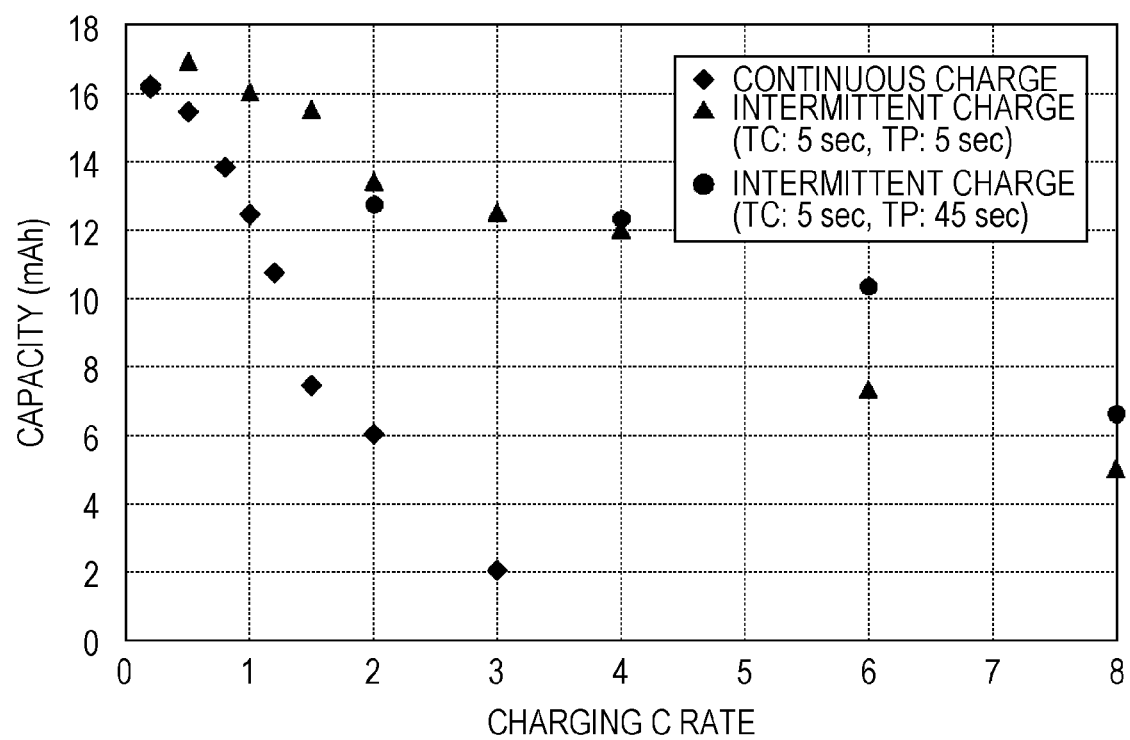
FIG. 10 is a view illustrating an example of a relationship between a charging current and a charging capacity in continuous charge or intermittent charge of a cell.

Next, the cell C was continuously charged or intermittently charged. FIG. 10 illustrates an example of a relationship between a charging current and a charging capacity in a case where the cell C was continuously charged or intermittently charged. In the intermittent charge, the application duration TC of the charging current was five seconds, and the pause TP was five seconds or forty five seconds.

As illustrated in FIG. 10, similar tendency to the cell A and the cell B was observed also in the cell C. In the continuous charge, the charging capacity decreased as the charging current increased. In FIG. 10, the charging current need be set to a low current such as less than 1 C in order to obtain a capacity that is 80% or more of the maximum charging capacity by continuously charging the cell C. Meanwhile, in FIG. 10, a capacity that is 80% or more of the maximum charging capacity was obtained by intermittent charge even in a case where the charging current is a high current of approximately 1 C to 2.5 C.

As is clear from the experiments of the cells A to C, a high charging capacity can be obtained by intermittent charge according to the present embodiment even in a case where various materials that constitute a secondary battery are different.

Embodiment 2

[Secondary Battery System]

Figure 11A:
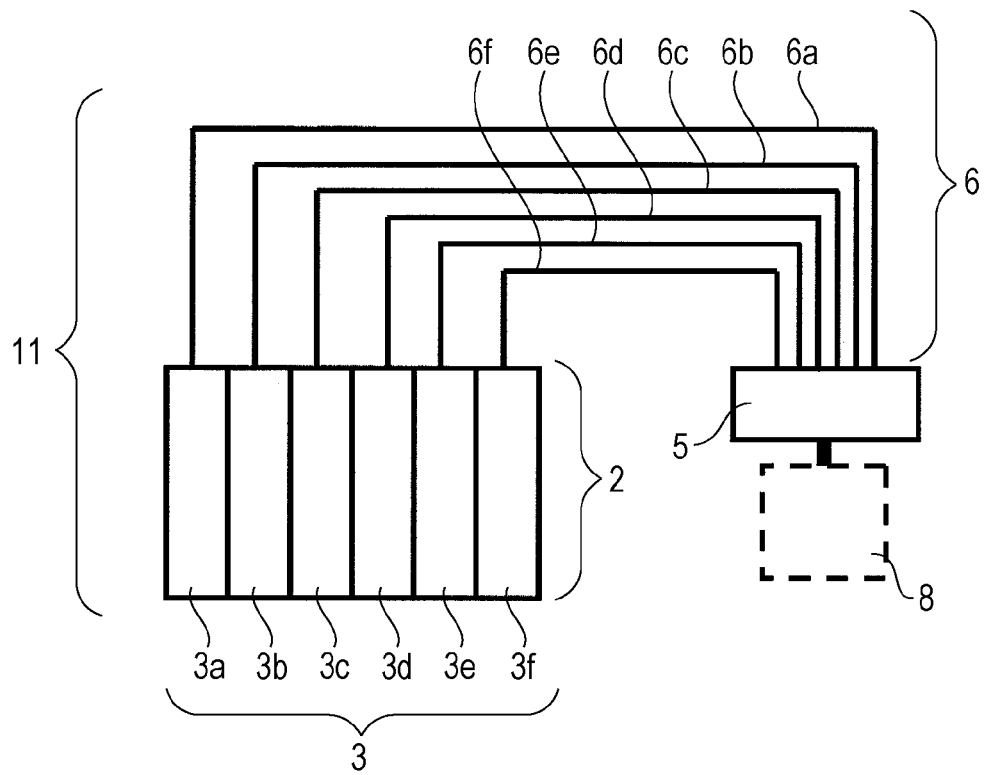
FIG. 11A is a schematic view illustrating an example of a configuration of a secondary battery system according to Embodiment 2.
Figure 11B:
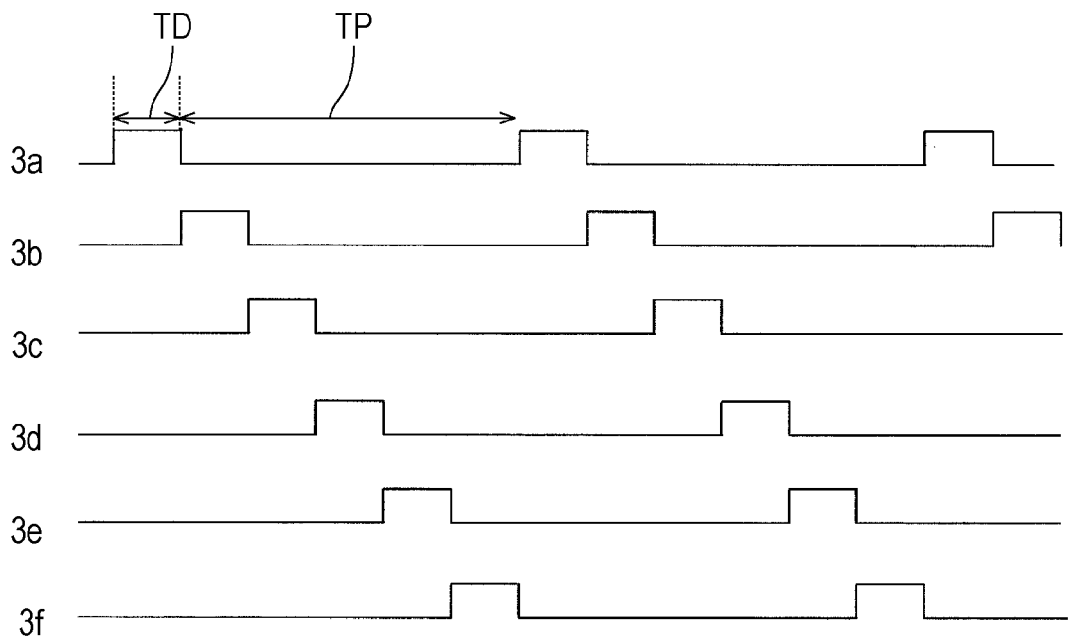
FIG. 11B illustrates a timing diagram of discharge in the secondary battery system.

FIGS. 11A and 11B are schematics view illustrating an example of a configuration of a secondary battery system according to Embodiment 2. The secondary battery system 11 illustrated in FIGS. 11A and 11B may have a similar configuration to the secondary battery system 1 according to Embodiment 1 except for that the secondary battery system 11 illustrated in FIGS. 11A and 11B does not include the power source 4 and except for the way of control of the controller 5. The secondary battery system 11 may be connected to a load 8.

The load 8 receives a current discharged from secondary batteries 3. The secondary battery system 11 or the load 8 may include a voltage stabilizing device according to need. Electric power transmission lines 6 transmit a discharging current from the secondary batteries 3 to the load 8.

The controller 5 controls an operation for discharging the plurality of secondary batteries 3. The controller 5 causes each of the plurality of secondary batteries 3 to repeatedly discharge a current with a pause between discharges. The value of the discharging current is set to a value such that a high discharging capacity cannot be obtained if continuous discharge is performed at this current. Specifically, the value of the discharging current is set to a value such that a discharging capacity decreases by 20% or more from the maximum discharging capacity if continuous discharge is performed at this current. The maximum discharging capacity corresponds to a discharging capacity obtained in a case where a target secondary battery is continuously discharged at a sufficiently low current. In other words, the discharging current of the present embodiment is higher than a current value typically set in continuous discharge.

As described above, a maximum discharging capacity can be obtained in a case where a secondary battery is continuously discharged at a sufficiently low current, and the discharging capacity decreases as the discharging current increases. In such continuous discharge, a current value at which a discharging capacity decreases by 20% from the maximum discharging capacity is referred to as a "current value u1". The discharging current of the present embodiment is set to a value that is equal to or larger than the current value u1. In order to achieve higher-speed discharge, the discharging current may be set to a current at which a discharging capacity decreases by 50% or 70% from the maximum discharging capacity in continuous discharge. The discharging current may be set to a value that is equal to or larger than a current value u2 at which a discharging capacity markedly decreases in continuous discharge. The discharging current may be set to a current value that is five or more times a recommended current of a secondary battery or ten or more times the recommended current. The discharging current may be, for example, set so that an average discharging current becomes not more than the current value u1 or not more than the current value u2. The average discharging current is the temporal average of values of discharging current during a total time of an application duration and a pause.

As described above, a decrease in discharging capacity caused by an increase in discharging current is considered to be because ions cannot be sufficiently diffused at the time of discharge of a high current. Therefore, a secondary battery in which ions cause electric conduction can have a property such that a discharging capacity decreases as a discharging current increases. Note, however, the current value u1 and the current value u2 can vary depending on the materials of the secondary battery, and the thickness of an active material layer of the secondary battery, for example. The current value u1, which varies depending on the secondary batteries 3, may be input to the controller 5. In a case where the plurality of secondary batteries 3 include secondary batteries whose materials or the like are different, current values u1 suitable for the respective secondary batteries may be input to the controller 5.

The controller 5 selectively switches a secondary battery from which a discharging current is drawn among the plurality of secondary batteries 3. Specifically, while a discharging current is being drawn from a selected one of the secondary batteries, the controller 5 stops discharging the other secondary batteries 3. For example, the controller 5 includes a selection controller and switching circuitry as in Embodiment 1.

Next, an example of an operation for discharging the secondary battery system 11 is described.

FIG. 11B is a timing diagram for explaining an example of the discharge operation of the present embodiment. First, a first secondary battery 3a is selected. The selected first secondary battery 3a and the load 8 are electrically connected to each other. The first secondary battery 3a is discharged at a discharging current that is not less than the current value u1, and the discharging current is drawn. A time taken to draw a discharging current from a target secondary battery in one discharge is referred to as a drawing time TD. The drawing time TD is a discharge time per discharge. Next, a second secondary battery 3b is selected. The second secondary battery 3b and the load 8 are electrically connected to each other. Similarly, a discharging current is drawn also from the second secondary battery 3b. This is repeated until a sixth secondary battery 3f is discharged. Then, the first secondary battery 3a is selected again, and the second discharge is performed. In this way, each of the secondary batteries 3 is discharged plural times with a pause TP in between. As is clear from FIG. 11B, during discharge of one secondary battery 3, discharge of the other secondary batteries 3 is stopped. Therefore, a high current that is not less than the current value u1 may be continuously supplied to the load 8.

The drawing time TD in one discharge is a duration taken to continuously draw a current whose value is not less than the current value u1 from a secondary battery 3 to be discharged. The drawing time TD is not limited in particular. For example, the drawing time TD may be shorter than a time taken for the discharging capacity of the secondary battery 3 to decrease by 20% or more from the maximum discharging capacity if the secondary battery 3 is continuously discharged. The drawing time TD may be, for example, less than one hour. The drawing time TD may be, for example, within five minutes. In this case, the decrease in discharging capacity can be more effectively suppressed. The drawing time TD may be, for example, within one minute or may be within thirty seconds. Meanwhile, in order to suppress a loss at the time of switching and an energy loss caused by a high-frequency component, the drawing time TD may be, for example, one or more seconds, ten or more seconds, or thirty or more seconds.

The pause TP is not limited in particular. The pause TP may be, for example, three or more seconds or thirty or more seconds. This makes it possible to achieve a time for movement of ions. The pause TP may be, for example, five or more minutes. The pause TP may be two or more times the drawing time TD or five or more times the drawing time TD. In a case where N secondary batteries 3 are discharged, the pause TP may be N or more times the drawing time TD.

An average discharging current value may be set to not more than the current value u2. Alternatively, the average discharging current value may be set to not more than the current value u1. In a case where the average discharging current value is kept not more than a predetermined current value, it is possible to obtain a high discharging capacity with more certainty.

The controller 5 may switch the secondary battery 3 not only on the basis of the drawing time TD, but also on the basis of the voltage of the secondary battery 3 that is being discharged. The controller 5 may, when the voltage of the secondary battery 3 that is being discharged reaches a predetermined value, stop discharge of the secondary battery 3 that is being discharged and switch the secondary battery 3 to another secondary battery 3 from which a discharging current is to be drawn next even if the drawing time TD has not elapsed. This makes it possible to suppress overdischarge from the secondary battery 3, thereby suppressing degradation of the secondary battery 3. In other words, the drawing time TD can be set long while suppressing overdischarge. Therefore, the number of times of switching of the discharged secondary battery 3 can be reduced. As a result, a loss of a switching time and a contact degradation caused by switching can be suppressed. The controller 5 may include a voltage monitor as described in Embodiment 1.

For example, a discharging current may be intermittently drawn from a secondary battery 3 that has reached a predetermined voltage in a still shorter drawing time TD. This makes it possible to increase the discharging capacity little by little. In this case, the drawing time TD may be set to two or less seconds or may be one or less seconds after the voltage of the secondary battery 3 reaches the predetermined voltage. The drawing time TD may be continuously changed in accordance with a change of the voltage of the secondary battery 3. Whether a discharging current is further drawn from the secondary battery 3 that has reached the predetermined value or discharge is finished may be determined when this secondary battery 3 is selected next. This determination may be made in accordance with the voltage of the secondary battery 3. In a case where a current is further discharged from the secondary battery 3 that has reached the predetermined value, the number of times of discharge may be set in advance. Alternatively, whether or not additional discharge is performed may be determined in accordance with whether or not the voltage of the secondary battery 3 has reached a threshold value that is larger than the predetermined value.

Figure 12A:
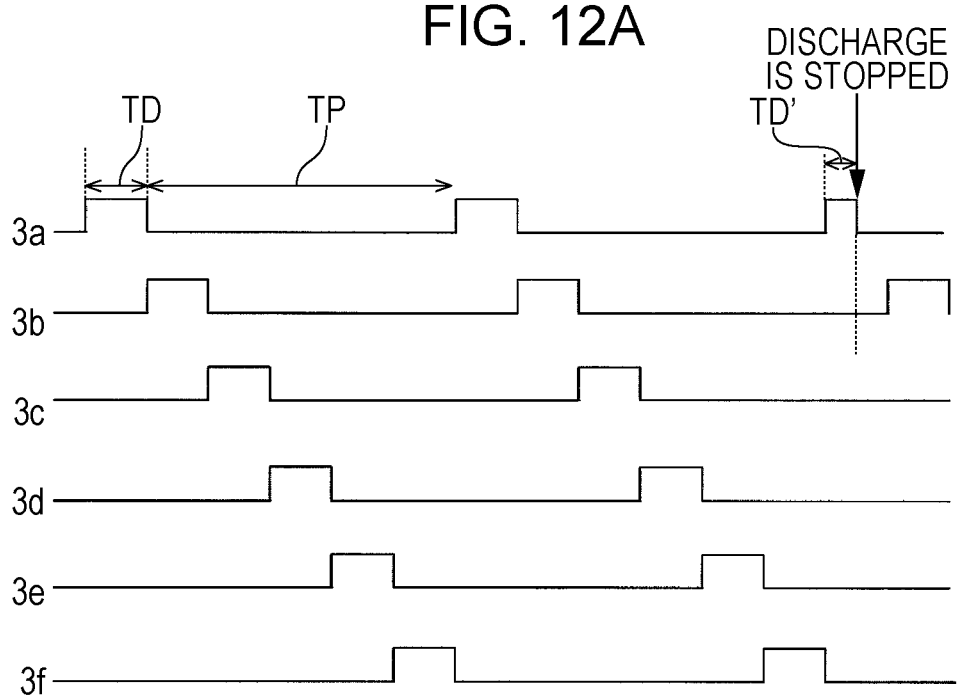
FIGS. 12A and 12B each illustrate a timing diagram of discharge in the secondary battery system.
Figure 12B:
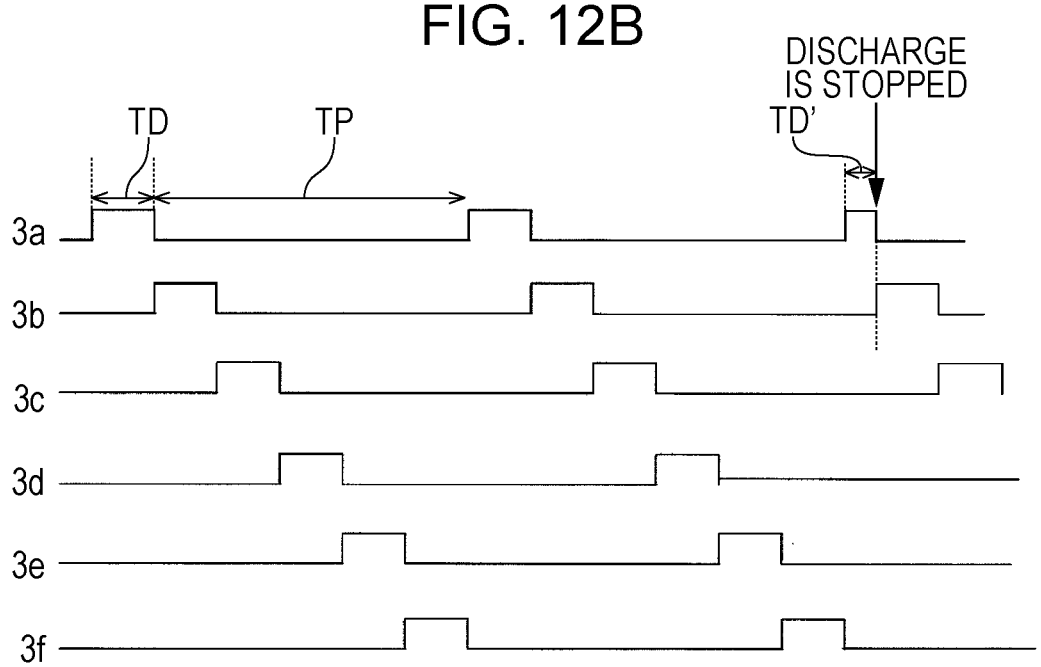

The controller 5 may stop discharge in a case where the set drawing time TD has not elapsed when the voltage of the secondary battery 3 reaches a predetermined value. In a case where discharge is stopped at a time point when a drawing discharge time TD' is elapsed, the drawing time TD' may be shorter than a drawing time TD in previous discharge of the same secondary battery 3, as illustrated in FIGS. 12A and 12B. Note that as illustrated in FIG. 12A, discharge of a next secondary battery 3 may be started after elapse of the drawing time TD in a case where discharge is stopped midway through the drawing time TD. This makes it slightly easy to control the secondary battery system 11. Alternatively, as illustrated in FIG. 12B, discharge of a next secondary battery may be started immediately after discharge is stopped midway through the drawing time TD. This makes it possible to shorten a total discharge time of the secondary battery section 2. The "total discharge time" refers to a time from the start of initial discharge to the end of discharge of all of the secondary batteries 3.

The controller 5 may monitor the temperature of the secondary batteries 3 as described in Embodiment 1. The controller 5 may include, for example, a temperature monitor. This makes it possible to prevent overheating of the secondary batteries 3.

The controller 5 may monitor an expansion deformation or an internal pressure of respective housings which contain the secondary batteries 3 as described in Embodiment 1. The controller 5 may include, for example, a housing monitor. This makes it possible to suppress breakage of the housing, thereby preventing degradation of the secondary batteries 3.

[Modification of Secondary Battery System]

Figure 13:
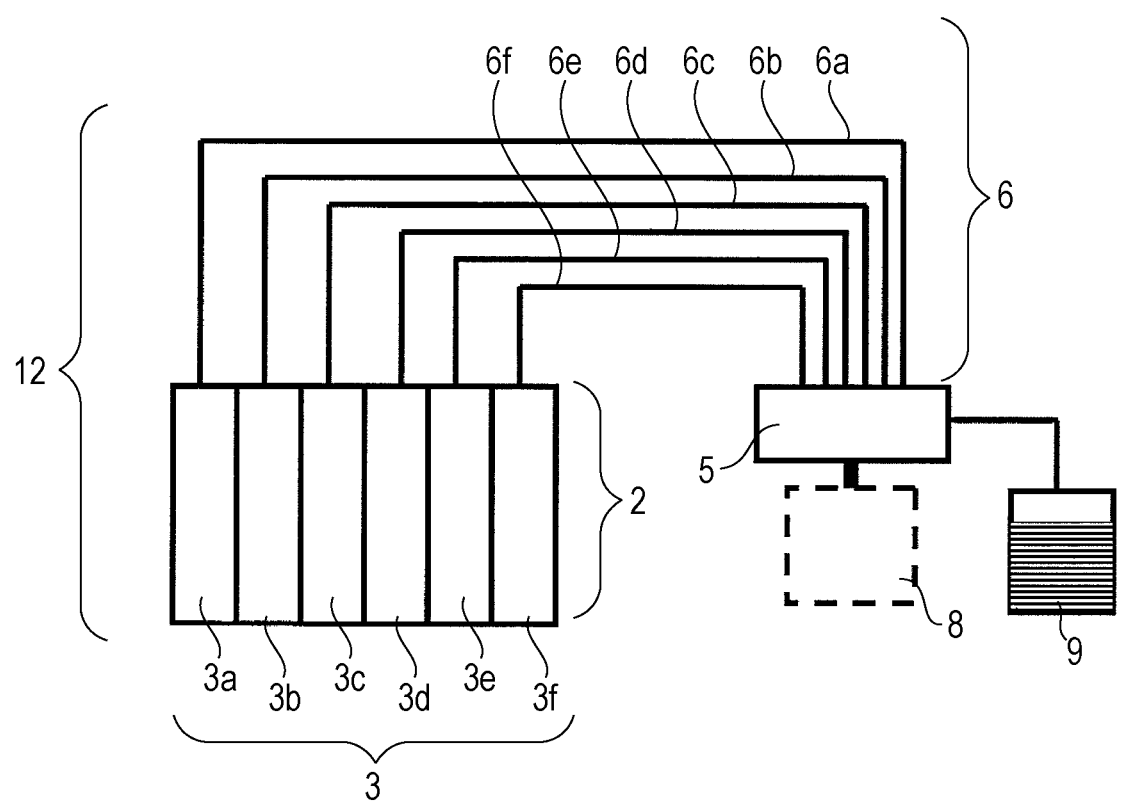
FIG. 13 is a schematic view illustrating a configuration of a secondary battery system according to a modification of Embodiment 2.

FIG. 13 illustrates another secondary battery system 12 of the present embodiment. The secondary battery system 12 includes a capacitor 9. The other features of the secondary battery system 12 are similar to those of the secondary battery system 11 illustrated in FIGS. 11A and 11B, and are therefore not explained repeatedly.

The capacitor 9 is a transitory capacitor. The capacitor 9 may selectively receive a discharging current from each of the plurality of secondary batteries 3 and stores the discharging current. The capacitor 9 may give the stored electric power to the load 8.

The controller 5 of the secondary battery system 12 may performs the following steps when switching a secondary battery to be discharged, for example, from the first secondary battery 3a to the second secondary battery 3b. In a state in which the first secondary battery 3a and the capacitor 9 are connected to the load 8, the controller 5 cuts the first secondary battery 3a from the load 8 while maintaining connection between the capacitor 9 and the load 8 and connects the second secondary battery 3b to the load 8. Accordingly, the load 8 is always connected to at least one of a secondary battery 3 and the capacitor 9. As a result, electric power is transmitted from the capacitor 9 to the load 8 at the time of switching, and therefore electric power transmission to the load 8 is not stopped. Moreover, short circuit between the first secondary battery 3a and the second secondary battery 3b is also prevented. It is therefore possible to stably transmit electric power to the load 8.

The electric power stored in the capacitor 9 may be supplied from a secondary battery 3 that is different from the secondary battery 3 connected to the load 8. Note that the capacitor 9 may be employed in consideration of a current value needed for a load, a switching time of the secondary batteries 3, and the like. Another electric storage element may be used instead of the capacitor 9.

[Method for Discharging Plurality of Secondary Batteries]

Next, a method for discharging a plurality of secondary batteries of the present embodiment is described with reference to the drawings.

Figure 14:
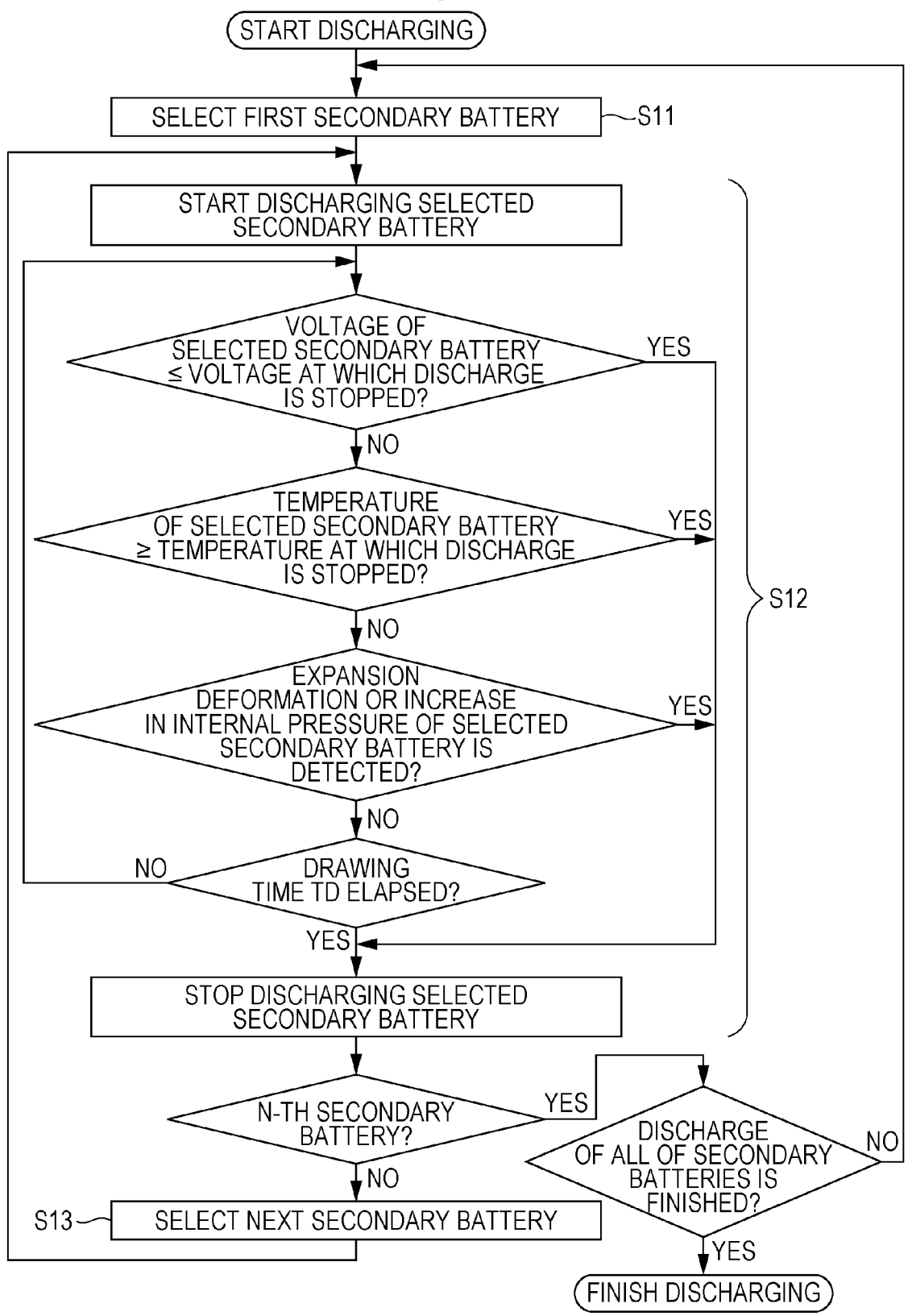
FIG. 14 is a flow chart for explaining an example of a discharging method of Embodiment 2.

FIG. 14 is a flow chart illustrating an example of the method for discharging the plurality of secondary batteries 3. In the following description, an example in which N secondary batteries are discharged is described.

In Step S11, a first secondary battery is selected from among a plurality of secondary batteries. In Step S12, the selected secondary battery is discharged, and thus a discharging current is drawn. The value of the discharging current is a value such that a discharging capacity declines by 20% or more from a maximum discharging capacity if the selected secondary battery is continuously discharged at this current. The discharge is stopped, for example, after elapse of the predetermined drawing time TD. Stoppage of discharge means stoppage of flow of a discharging current into the load 8. In Step S13, a secondary battery that is different from the secondary battery selected in Step S11 is selected as a second secondary battery. In other words, a secondary battery to be discharged is switched. At the time of switching, electricity is not concurrently conducted to two or more of the plurality of secondary batteries. Subsequently, the second secondary battery selected in Step S13 is discharged in a similar manner to Step S12. Then, a secondary battery that is different from the secondary batteries selected in Step S11 and Step 13 is selected as a third secondary battery. This is repeated until a N-th secondary battery is discharged. Then, the first secondary battery is selected again. In this way, each of the secondary batteries is discharged plural times with a pause between discharges.

In Step S12, the voltage of the secondary battery that is being discharged may be monitored. In this case, discharge may be stopped when the voltage reaches a predetermined voltage value. The predetermined voltage value for stopping discharge may be, for example, determined in advance in accordance with the specification of the secondary battery. In a case where the secondary battery includes a positive electrode made of lithium cobalt oxide and a negative electrode made of graphite, this voltage is, for example, 3 V.

As in Embodiment 1, in Step S12, the temperature of the secondary battery that is being discharged or an expansion deformation or an internal pressure of a housing in which the secondary battery that is being discharged is contained may be monitored.

Note that although the voltage, temperature, expansion deformation, or internal pressure of the secondary battery that is being discharged is monitored in Step S12 in the flow chart illustrated in FIG. 14, none of these may be monitored, or at least one of these may be monitored.

The discharging method described above may be performed by a discharging device including a controller that controls a discharging operation. The configuration and operation of the controller within the discharging device are similar to those of the controller 5 of the secondary battery system 11, and are therefore not described in detail. The discharging device may include a plurality of connection terminals respectively connectable to any secondary batteries. The discharging device may include a terminal to be connected to an external load.

The inventors of the present invention studied, for each of three types of cells A, B, and C for evaluation, a relationship between a discharging current and a discharging capacity and thus confirmed the effects of the present embodiment.

[Study on Method for Discharging Cell A]

The cell A was prepared. This cell A is the same as that described in Embodiment 1, and is therefore not explained repeatedly.

Figure 15:
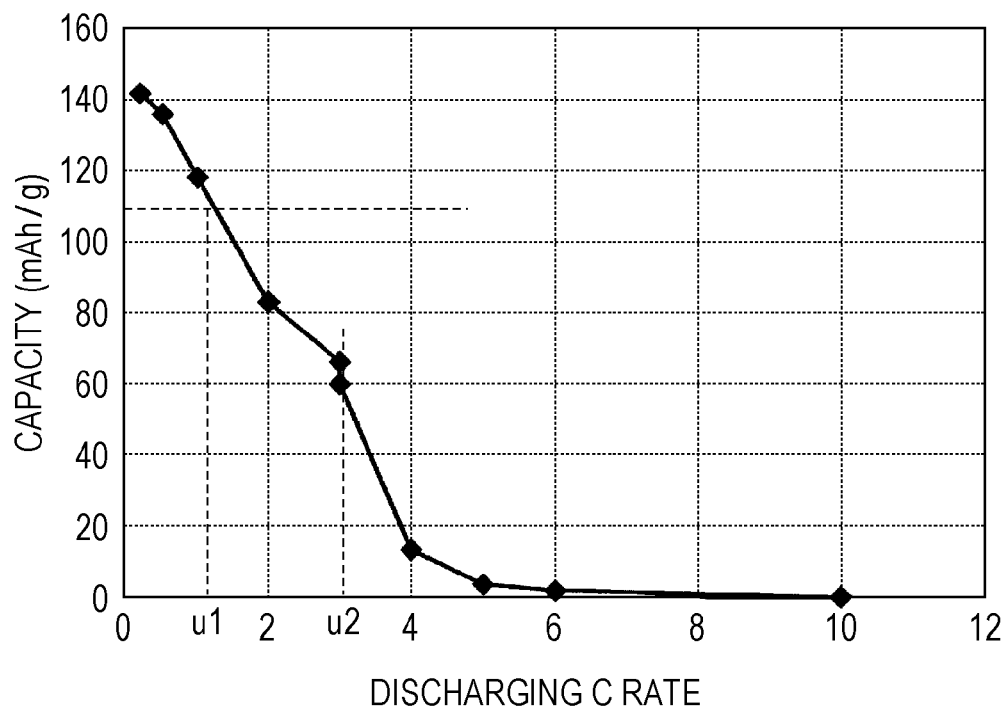
FIG. 15 is a view illustrating an example of a relationship between a discharging current and a discharging capacity in continuous discharge of a cell.

Next, the cell A was continuously discharged at a direct constant current of various values. FIG. 15 illustrates an example of a relationship between a discharging current and a discharging capacity in continuous discharge of the cell A.

As illustrated in FIG. 15, in the continuous discharge, the discharging capacity decreased as the discharging current increased. In FIG. 15, the discharging current need be kept, for example, approximately 1 C or less in order to obtain a maximum discharging capacity or a high discharging capacity close to the maximum discharging capacity. In a case where the cell A is continuously discharged at 4 C, only a discharging capacity that is approximately 10% of the maximum discharging capacity (approximately 140 mAh/g in FIG. 15) can be obtained. Note that "1 C" denotes a current value that corresponds to a charge amount per one hour that flow from a second battery in a case where the secondary battery is continuously discharged at a low current. The discharging current becomes larger as the value of C becomes larger. For example, discharge at 0.1 C means discharge of such a current that a full discharging capacity is reached in ten hours.

In FIG. 15, the discharging current need be set to a low current such as less than 2 C in order to obtain a capacity of 80% or more of the maximum discharging capacity by continuously discharging the cell A. Therefore, it takes a long time to fully discharge all of the plurality of secondary batteries. Alternatively, a high discharging current cannot be obtained from the whole secondary battery system 11.

In FIG. 15, in a case where the cell A was continuously discharged at a direct constant current, the current value u1 at which the discharging capacity decreased by 20% from the maximum discharging capacity was approximately 2 C, and the current value u2 at which the discharging capacity markedly decreased was approximately 3 C. Note that the current value u2 may be, for example, a current value at which the inclination of the graph illustrated in FIG. 15 becomes maximum. In other words, the current value u2 may be a current value at which $\Delta C_B/\Delta I$ becomes maximum where $C_B$ is a discharging capacity and I is a discharging current.

Figure 16:
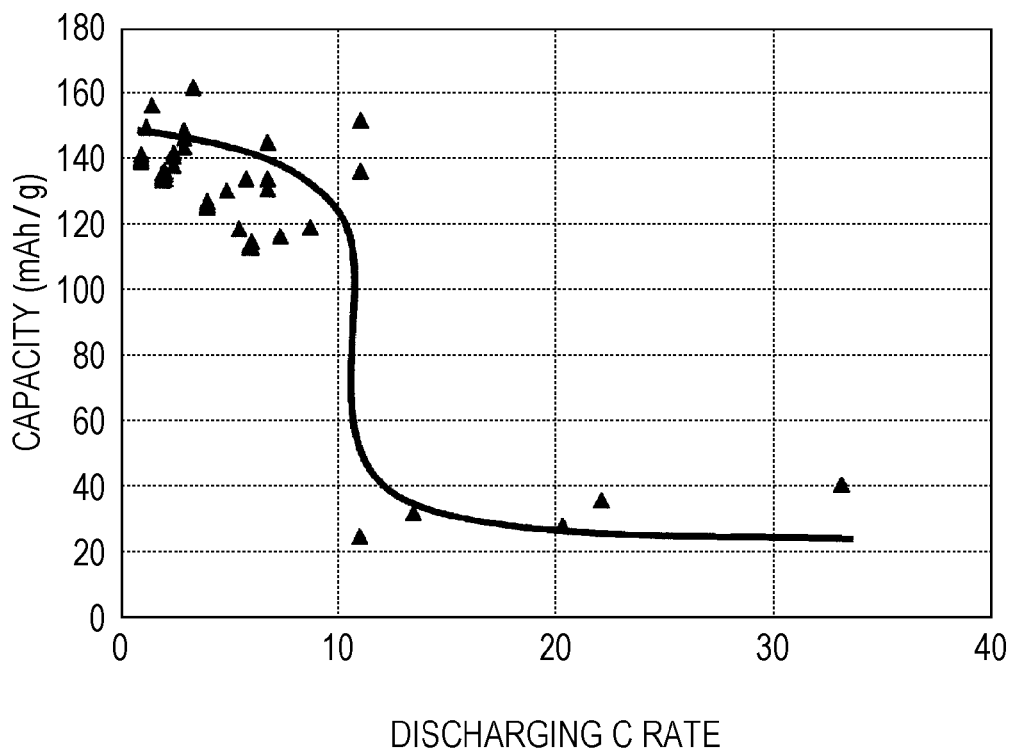
FIG. 16 is a view illustrating an example of a relationship between a discharging current and a discharging capacity in intermittent discharge of a cell.

Next, the cell A was intermittently discharged at a discharging current of various values with a pause between discharged. In the intermittent discharge, the drawing time TD of the discharging current was 10 seconds, and the pause TP was 90 seconds. FIG. 16 illustrates an example of a relationship between a discharging current and a discharging capacity in the intermittent discharge of the cell A.

As illustrated in FIG. 16, according to the intermittent discharge, a higher discharging capacity was obtained at each discharging current value than the continuous discharge. For example, in a case where the cell A was intermittently discharged at a discharging current that is not less than the current value u1 or not less than the current value u2 illustrated in FIG. 16, a sufficient discharging capacity was achieved. In the example illustrated in FIG. 16, even in a case where the discharging current was a high current of approximately 1 C to 11 C, a discharging capacity that is approximately 80% of the maximum charging capacity was obtained. Therefore, it was confirmed that a high discharging capacity was obtained by intermittently discharging each of the secondary batteries at a current that is not less than the current value u1 or not less than the current value u2.

Figure 17:
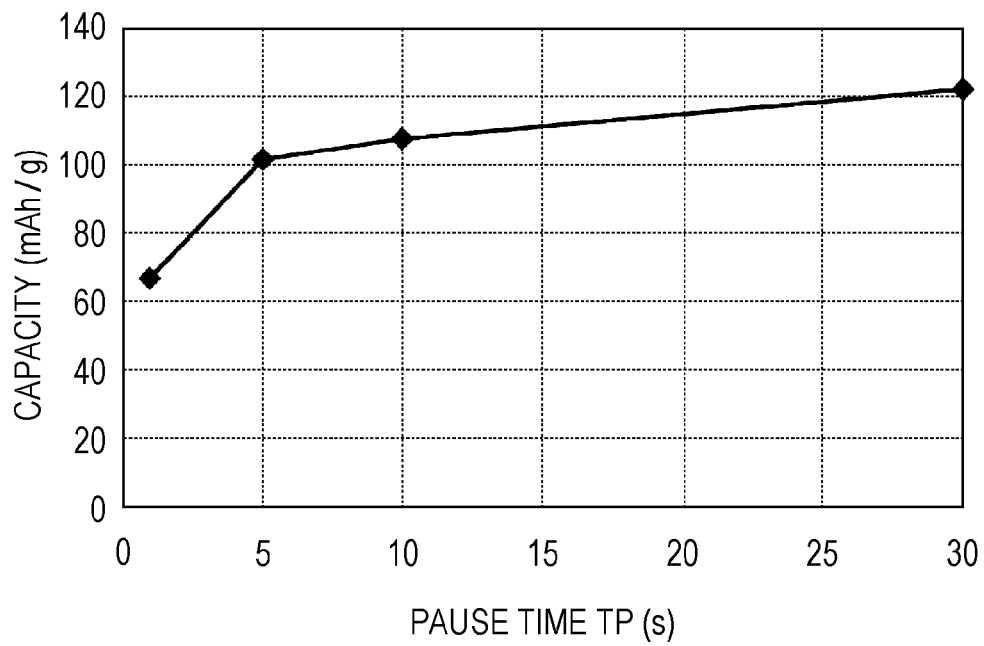
FIG. 17 is a view illustrating an example of a relationship between a pause and a discharging capacity in intermittent discharge of a cell.

FIG. 17 illustrates an example of a relationship between the pause TP and the discharging capacity in a case where the cell A was intermittently discharged. The cell A was discharged by fixing the drawing time TD to 10 seconds, fixing the discharging current to 2 C, and changing the pause TP.

As illustrated in FIG. 17, in a case where the pause TP was 5 or more seconds, a high discharging capacity that is substantially equivalent to the maximum discharging capacity was obtained. In this case, a temporal average discharging current was 1.3 C according to the following equation:

$$(I \times TC)/(TC+TP)=(2\ C \times 10\ \text{sec})/(10\ \text{sec}+TP\ (\text{sec}))=1.3\ (C)$$

This average discharging current was almost equal to the current value u1 illustrated in FIG. 15. This shows that a high discharging capacity can be obtained with more certainty by setting the drawing time TD, the pause TP, and the discharging current so that the average discharging current becomes not more than the current value u1.

Note that a similar result was obtained even in a case where the drawing time and the discharging current are different (not illustrated). For example, a similar result was obtained in a case where the drawing time was five seconds and the discharging current was 6 C.

[Study on Method for Discharging Cell B]

The cell B was prepared. This cell B is the same as that described in Embodiment 1, and is therefore not explained repeatedly.

Figure 18:
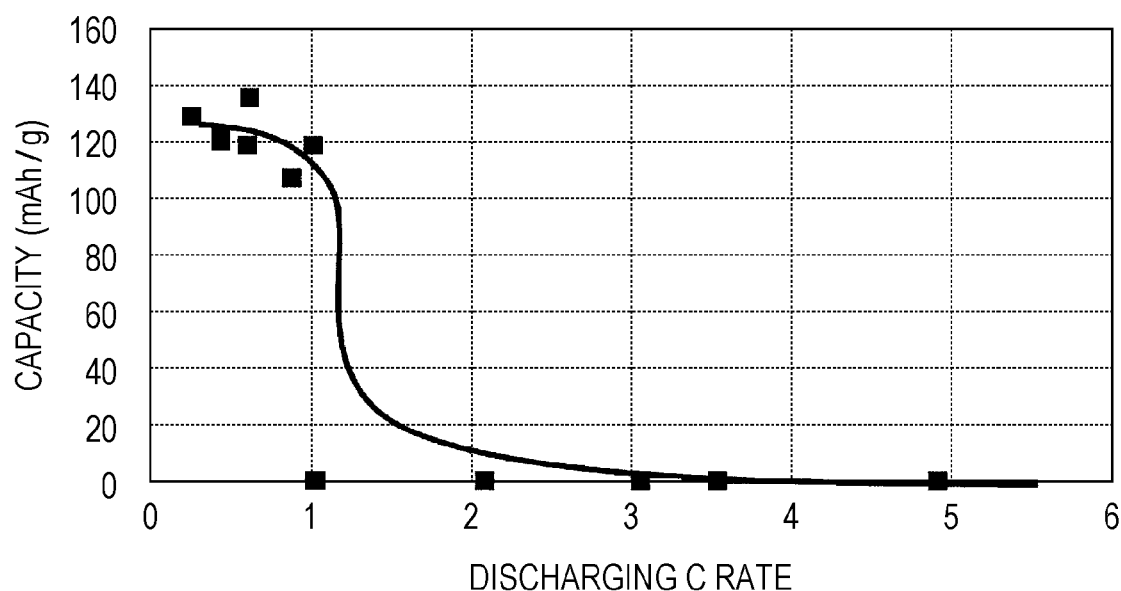
FIG. 18 is a view illustrating an example of a relationship between a discharging current and a discharging capacity in continuous discharge of a cell.

The cell B was continuously discharged at a direct constant current of various values. FIG. 18 illustrates an example of a relationship between a discharging current and a discharging capacity in the continuous discharge of the cell B.

As illustrated in FIG. 18, in the continuous discharge, the discharging capacity decreased as the discharging current increased. In FIG. 18, the discharging current need be kept, for example, approximately 1 C or less in order to obtain a maximum discharging capacity or a high discharging capacity close to the maximum discharging capacity. In a case where the cell B is continuously discharged at 2 C, only a discharging capacity that is 5% or less of the maximum discharging capacity (approximately 130 mAh/g in FIG. 18) was obtained.

In FIG. 18, the discharging current need be set to a low current such as less than 1 C in order to obtain a capacity that is 80% or more of the maximum discharging capacity by continuously discharging the cell B. Therefore, it takes a long time to discharge all of the plurality of secondary batteries to a predetermined voltage.

In the example illustrated in FIG. 18, both of the current value u1 at which the discharging capacity decreased by 20% or more from the maximum discharging capacity and the current value u2 at which the discharging capacity markedly decreased were approximately 1 C.

Figure 19:
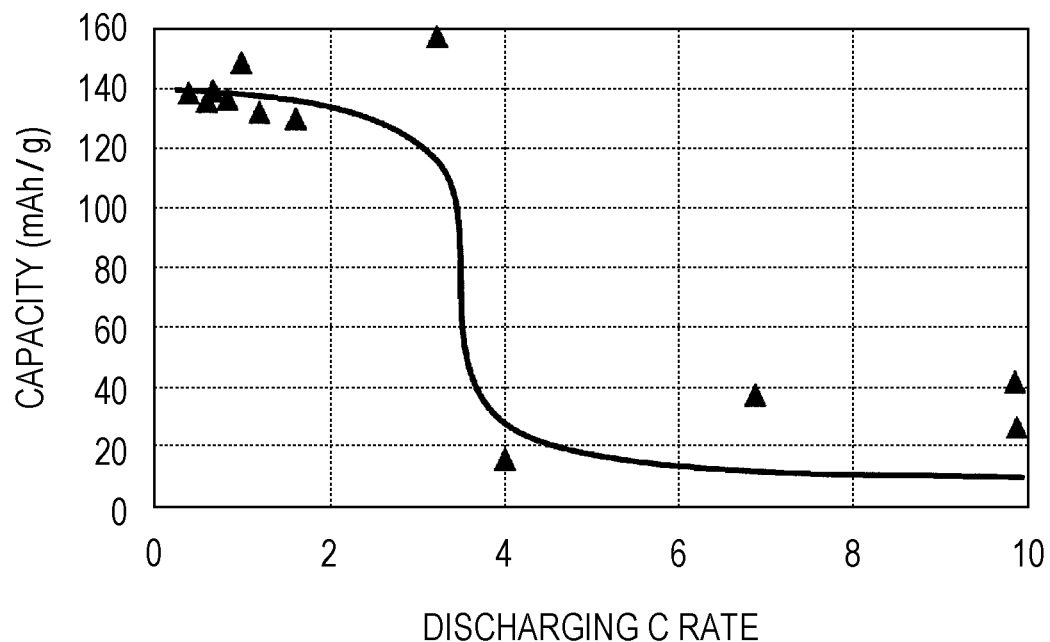
FIG. 19 is a view illustrating an example of a relationship between a discharging current and a discharging capacity in intermittent discharge of a cell.

Next, the cell B was intermittently discharged at a discharging current of various values with a pause between discharges. In the intermittent discharge, the drawing time TD of the discharging current was 10 seconds, the pause TP was 90 seconds. FIG. 19 illustrates an example of a relationship between a discharging current and a discharging capacity in the intermittent discharge.

As illustrated in FIG. 19, according to the intermittent discharge, a higher discharging capacity was obtained at each discharging current value than in the continuous discharge. For example, in a case where the cell B was intermittently discharged at a discharging current that is not less than the current value u1 or not less than the current value u2 illustrated in FIG. 18, a sufficient discharging capacity was achieved. In the example illustrated in FIG. 19, a discharging capacity that is approximately 80% of the maximum discharging capacity was obtained even in a case where the discharging current is a high current of approximately 1 C to 3.5 C. Therefore, it was confirmed that a high discharging capacity was obtained by intermittently discharging each of the secondary batteries at a current that is not less than the current value u1 or not less than the current value u2.

Figure 20:
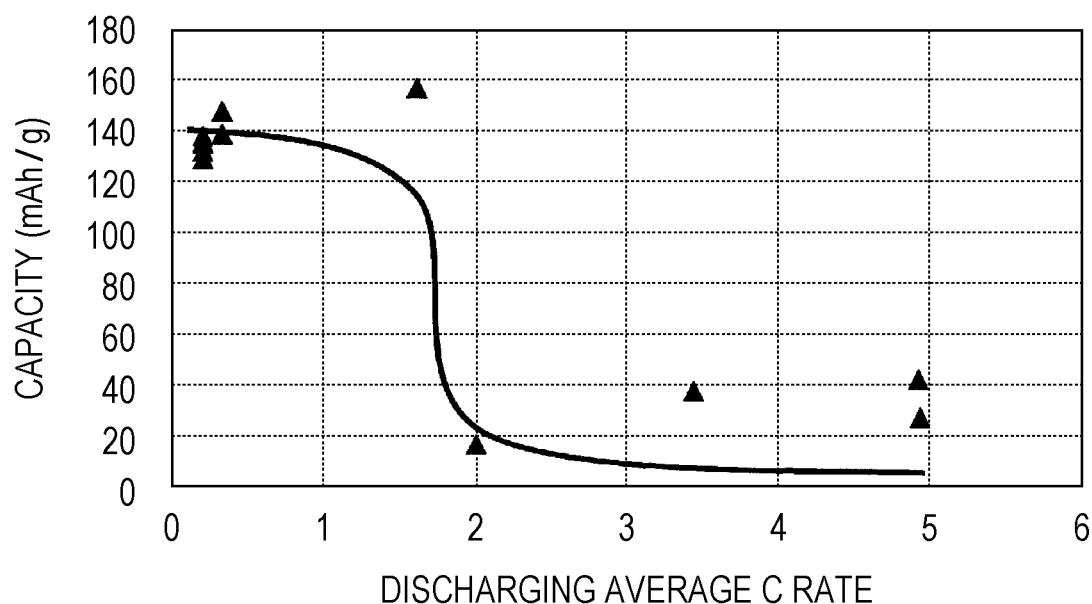
FIG. 20 is a view illustrating an example of a relationship between an average discharging current and a discharging capacity in intermittent discharge of a cell.

FIG. 20 illustrates an example of a relationship between an average discharging current value and a discharging capacity in the intermittent discharge. The cell B was charged while fixing the drawing time TD to ten seconds and changing the value of discharging current and the length of the pause TP. The average discharging current value indicated by the horizontal axis of FIG. 20 is the average of values of pulsed discharging current discharged by one secondary battery during a total time of a discharging time and a pause.

As illustrated in FIG. 20, in a case where the average discharging current value was less than 2 C, a high discharging capacity equivalent to a discharging capacity (see FIG. 18) obtained in a case where the cell B was continuously discharged at a low current of 1 C or less was obtained. Therefore, according to the method for discharging of the present embodiment, a plurality of secondary batteries can be efficiently discharged.

[Study on Method for Charging Cell C]

The cell C was prepared. This cell C is the same as that described in Embodiment 1, and is therefore not explained repeatedly.

Figure 21:
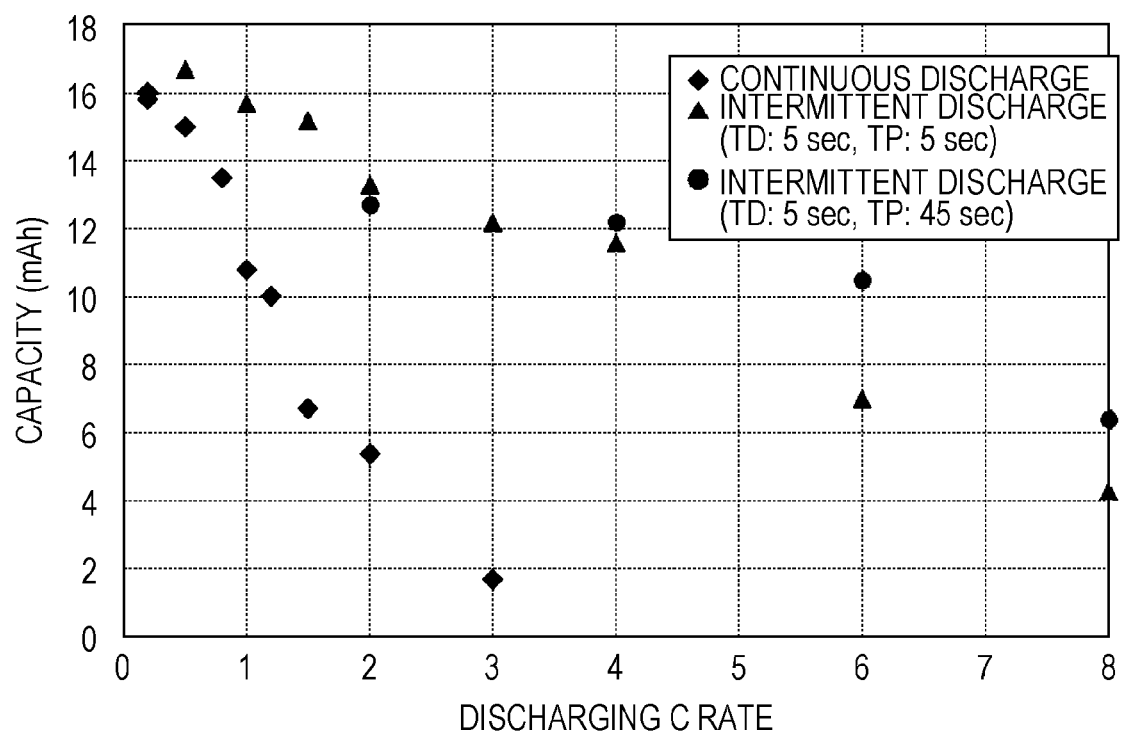
FIG. 21 is a view illustrating an example of a relationship between a discharging current and a discharging capacity in continuous discharge or intermittent discharge of a cell.

Next, the cell C was continuously discharged or intermittently discharged. FIG. 21 illustrates an example of a relationship between a discharging current and a discharged capacity in a case where the cell C was continuously discharged or intermittently discharged. In the intermittent discharge, the drawing time TD of the charging current was five seconds, and the pause TP was five seconds or forty five seconds.

As illustrated in FIG. 21, similar tendency to the cell A and the cell B was observed also in the cell C. In the continuous discharge, the discharging capacity decreased as the discharging current increased. In FIG. 21, the discharging current need be set to a low current such as less than 1 C in order to obtain a capacity that is 80% or more of the maximum discharging capacity by continuously discharging the cell C. Meanwhile, in FIG. 21, a capacity that is 80% or more of the maximum discharging capacity was obtained by intermittent discharge even in a case where the discharging current is a high current of approximately 1 C to 2 C.

As is clear from the experiments of the cells A to C, a high discharging capacity can be obtained by intermittent discharge according to the present embodiment even in a case where various materials that constitute a secondary battery are different.

Although embodiments of the present disclosure have been described above, the present disclosure is not limited to these.

A secondary battery system of one aspect of the present disclosure is applicable, for example, to power sources for various types of mobile devices, stationary power sources, power sources for vehicles, and the like. The method is applicable to speedy capacity evaluation etc. of a plurality of secondary batteries.

While the present disclosure has been described with respect to exemplary embodiments thereof, it will be apparent to those skilled in the art that the disclosure may be modified in numerous ways and may assume many embodiments other than those specifically described above. Accordingly, it is intended by the appended claims to cover all modifications of the disclosure that fall within the true spirit and scope of the disclosure.

What is claimed is:

1. A secondary battery system comprising:
    a plurality of secondary batteries;
    a power source operative to supply a current to the plurality of secondary batteries; and
    control circuitry operative to intermittently charge each of the plurality of secondary batteries plural times with a pause between charges while repeating a cycle including (a) selecting a secondary battery to be charged next from among the plurality of secondary batteries and (b) charging the selected secondary battery at a charging current not less than a standard current, where the standard current is defined to reduce a charging capacity of each secondary battery decreases by 20% from a maximum charging capacity in a case where the secondary battery is continuously charged at the standard current.

2. The secondary battery system according to claim 1, wherein the control circuitry is operative not to concurrently charge two or more of the plurality of secondary batteries.

3. The secondary battery system according to claim 1, further comprising a plurality of electric power transmission lines that are respectively connected to the plurality of secondary batteries, wherein
    the control circuitry is operative to select the secondary battery to be charged by selecting an electric power transmission line connected to the secondary battery to be charged from among the plurality of electric power transmission lines.

4. The secondary battery system according to claim 1, wherein the control circuitry is further operative to stop charging when a voltage of the selected secondary battery reaches a predetermined value.

5. The secondary battery system according to claim 4, wherein the control circuitry is operative to stop charging when a voltage of the selected secondary battery reaches the predetermined value midway through an application duration of the charging current per one charging.

6. The secondary battery system according to claim 4, further comprising a voltage monitor operative to monitor the voltage of the selected secondary battery.

7. The secondary battery system according to claim 1, further comprising:

a temperature monitor operative to monitor a temperature of each of the plurality of secondary batteries, wherein
the control circuitry is operative to stop charging when a temperature of the selected secondary battery reaches a predetermined value.

8. The secondary battery system according to claim 1, further comprising: a temperature monitor operative to monitor a temperature of the selected secondary battery.

9. The secondary battery system according to claim 1, further comprising:
a plurality of housings respectively containing the plurality of secondary batteries; and
a housing monitor operative to monitor states of the plurality of housings, wherein
the control circuitry is further operative to stop charging the selected secondary battery when an expansion deformation or an internal pressure of one of the plurality of housings that contains the selected secondary battery reaches a predetermined value.

10. The secondary battery system according to claim 9, wherein
the housing monitor includes a plurality of sensors which are respectively disposed on outer walls of the plurality of housings; and
each sensor is a location sensor, a piezoelectric sensor, or a sensor using a film or a wire rod in which a tensile break occurs in response to the predetermined tensile stress.

11. A secondary battery system comprising:
a plurality of secondary batteries; and
control circuitry operative to intermittently discharging each of the plurality of secondary batteries plural times with a pause between discharges while repeating a cycle including (a) selecting a secondary battery to be discharged next from among the plurality of secondary batteries and (b) drawing a discharging current not less than a standard current from the selected secondary battery, where the standard current is defined to reduce a discharging capacity of each secondary battery decreases by 20% from a maximum discharging capacity in a case where the secondary battery is continuously discharged at the standard current.

12. The secondary battery system according to claim 11, wherein the control circuitry is operative not to concurrently discharge two or more of the plurality of secondary batteries.

13. The secondary battery system according to claim 11, further comprising a plurality of electric power transmission lines that are respectively connected to the plurality of secondary batteries, wherein
the control circuitry is operative to select the secondary battery to be discharged by selecting an electric power transmission line connected to the secondary battery to be discharged from among the plurality of electric power transmission lines.

14. The secondary battery system according to claim 11, wherein the control circuitry is further operative to stop discharging when a voltage of the selected secondary battery reaches a predetermined value.

15. The secondary battery system according to claim 14, further comprising a voltage monitor operative to monitor the voltage of the selected secondary battery.

16. The secondary battery system according to claim 11, further comprising a temperature monitor operative to monitor a temperature of each of the plurality of secondary batteries, wherein
the control circuitry is operative to stop discharging when a temperature of the selected secondary battery reaches a predetermined value.

17. The secondary battery system according to claim 11, further comprising:
a temperature monitor operative to monitor a temperature of the selected secondary battery.

18. The secondary battery system according to claim 11, further comprising:
a plurality of housings respectively containing the plurality of secondary batteries; and
a housing monitor operative to monitor states of the plurality of housings, wherein
the control circuitry is further operative to stop discharging the selected secondary battery when an expansion deformation or an internal pressure of one of the plurality of housings that contains the selected secondary battery reaches a predetermined value.

19. The secondary battery system according to claim 18, wherein:
the housing monitor includes a plurality of sensors which are respectively disposed on outer walls of the plurality of the housings; and
each sensor is a location sensor, a piezoelectric sensor, or a sensor using a film or a wire rod in which a tensile break occurs in response to a predetermined tensile stress.

20. The secondary battery system according to claim 11, further comprising a capacitor operative to receive electricity from at least one of the plurality of secondary batteries and supply electricity to a load.

* * * * *